US012027318B2

(12) United States Patent
Kamimura et al.

(10) Patent No.: US 12,027,318 B2
(45) Date of Patent: Jul. 2, 2024

(54) CAPACITOR AND METHOD FOR MANUFACTURING CAPACITOR

(71) Applicant: Panasonic Intellectual Property Management Co., Ltd., Osaka (JP)

(72) Inventors: Yoshiki Kamimura, Toyama (JP); Takeshi Imamura, Toyama (JP); Akihiro Morikawa, Osaka (JP); Wataru Tamura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 134 days.

(21) Appl. No.: 17/695,227

(22) Filed: Mar. 15, 2022

(65) Prior Publication Data
US 2022/0208458 A1 Jun. 30, 2022

Related U.S. Application Data

(63) Continuation of application No. PCT/JP2020/031156, filed on Aug. 18, 2020.

(30) Foreign Application Priority Data

Sep. 17, 2019 (JP) .................................. 2019-168288
Jan. 10, 2020 (JP) .................................. 2020-002980

(51) Int. Cl.
*H01G 4/228* (2006.01)
*H01G 2/10* (2006.01)
(Continued)

(52) U.S. Cl.
CPC ............ *H01G 4/228* (2013.01); *H01G 2/106* (2013.01); *H01G 4/224* (2013.01); *H01G 4/38* (2013.01)

(58) Field of Classification Search
None
See application file for complete search history.

(56) References Cited

U.S. PATENT DOCUMENTS

| 2013/0033913 | A1* | 2/2013 | Sparka | H01G 4/228 |
| | | | | 361/303 |
| 2014/0355221 | A1 | 12/2014 | Sawada et al. | |
| 2018/0109253 | A1 | 4/2018 | Tanabe et al. | |

FOREIGN PATENT DOCUMENTS

| JP | 2005108957 A | * | 4/2005 | ............ H01G 4/224 |
| JP | 2014-171342 A | | 9/2014 | |

(Continued)

OTHER PUBLICATIONS

International Search Report received in corresponding International Application No. PCT/JP2020/31156, dated Oct. 27, 2020, w/English Translation.

*Primary Examiner* — Eric W Thomas
(74) *Attorney, Agent, or Firm* — Rimon P.C.

(57) ABSTRACT

A capacitor includes a bus bar. The bus bar includes a bus bar body member and a terminal formation member configured to be superposed on and fixed to a terminal formation part of the bus bar body member. In the terminal formation part, a plurality of first connection terminal parts are formed so as to be arranged in one direction, by portions of the terminal formation part being cut and raised. In the terminal formation member, a plurality of second connection terminal parts are formed so as to be arranged in one direction, by portions of the terminal formation member being cut and raised, and second openings are formed in places where the portions have been cut and raised. The first connection terminal parts and the second connection terminal parts are alternately arranged in one direction, by the first connection terminal parts being passed through the second openings.

4 Claims, 17 Drawing Sheets

(51) Int. Cl.
      *H01G 4/224*     (2006.01)
      *H01G 4/38*      (2006.01)

(56) References Cited

FOREIGN PATENT DOCUMENTS

| | | |
|---|---|---|
| JP | 2014-233193 A | 12/2014 |
| JP | 2017-112168 A | 6/2017 |
| JP | 2018-067990 A | 4/2018 |
| JP | 2019-154124 A | 9/2019 |

\* cited by examiner

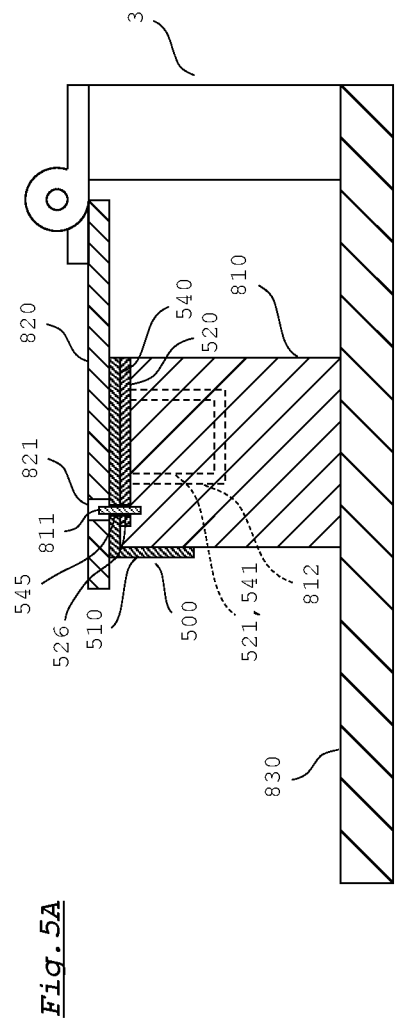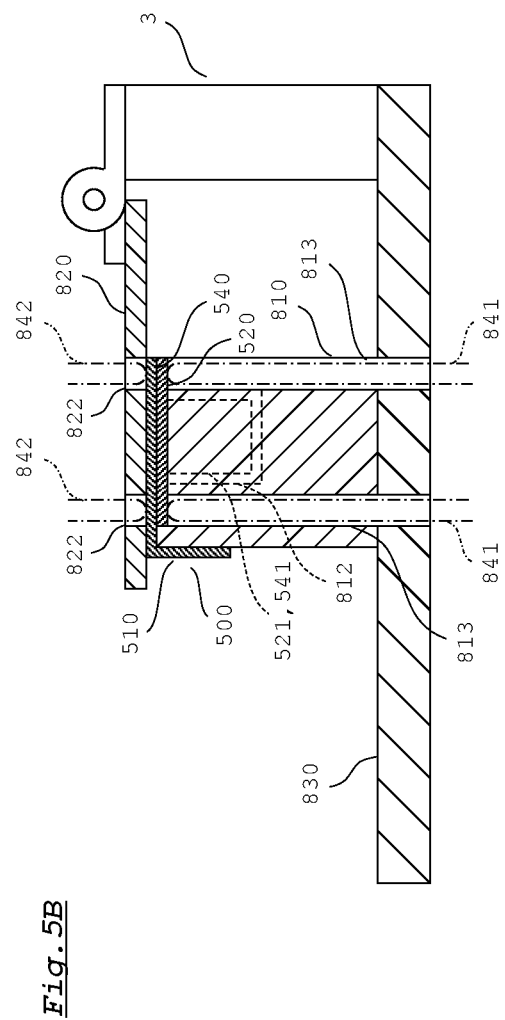

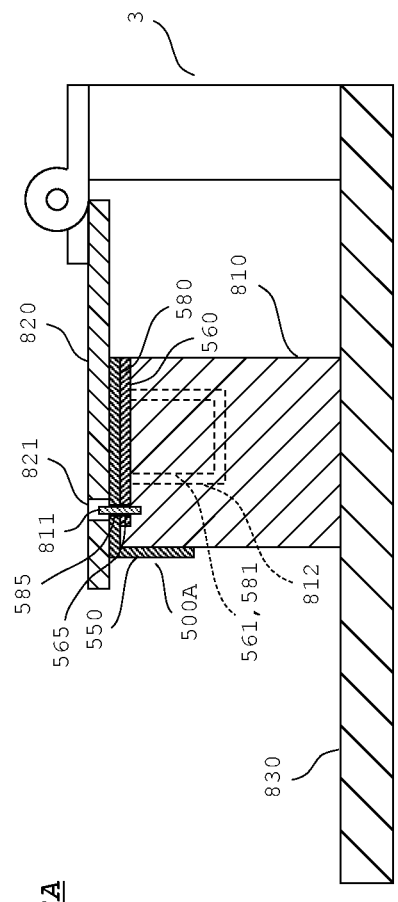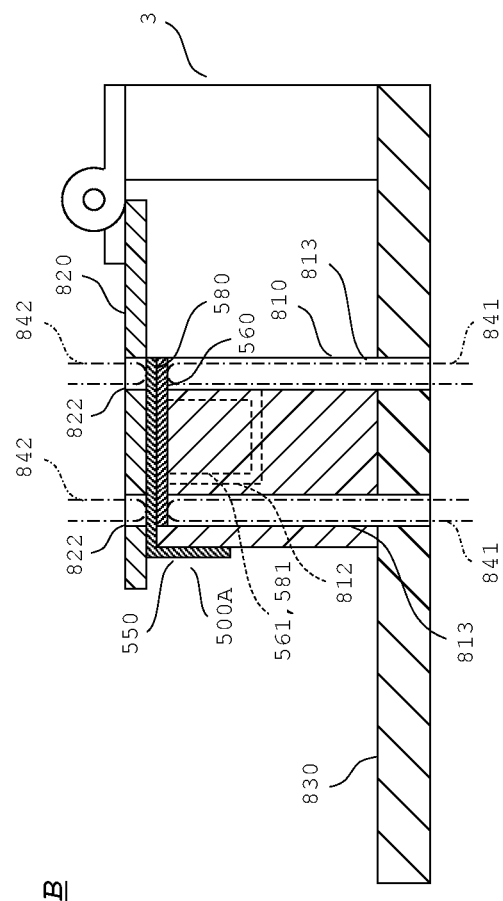

CAPACITOR AND METHOD FOR MANUFACTURING CAPACITOR

CROSS REFERENCE TO RELATED APPLICATION

This application is a continuation of International Application No. PCT/JP2020/31156 filed on Aug. 18, 2020, entitled "CAPACITOR AND METHOD FOR MANUFACTURING CAPACITOR", which claims priority under 35 U.S.C. Section 119 of Japanese Patent Application No. 2019-168288 filed on Sep. 17, 2019, entitled "CAPACITOR AND METHOD FOR MANUFACTURING CAPACITOR" and Japanese Patent Application No. 2020-002980 filed on Jan. 10, 2020, entitled "CAPACITOR AND METHOD FOR MANUFACTURING CAPACITOR". The disclosure of the above applications is incorporated herein by reference.

BACKGROUND OF THE INVENTION

1. Field of the Invention

The present invention relates to a capacitor and a method for manufacturing the capacitor.

2. Disclosure of Related Art

To date, a capacitor to be connected to an external device such as a semiconductor device and having a configuration in which a bus bar is connected to a capacitor element has been known. In the capacitor, a plurality of connection terminal parts arranged in one direction are provided to a bus bar, and each terminal of the external device is connected to a corresponding connection terminal part. An example of such a capacitor is described in Japanese Laid-Open Patent Publication No. 2017-112168, for example.

In the film capacitor of Japanese Laid-Open Patent Publication No. 2017-112168, a front bus bar and a rear bus bar which are connected to a capacitor element respectively include third plate parts that overlap each other with an insulation sheet therebetween. In an upper end portion of each third plate part, a plurality of connection terminal parts are disposed so as to have a predetermined interval therebetween in the left-right direction. Each connection terminal part has a rectangular shape and is bent, in a lower end portion thereof, at a substantially right angle with respect to the third plate part, and the both planes thereof are oriented in the left-right direction.

In the above film capacitor, the width in the front-rear direction of each connection terminal part, i.e., the width in the direction in which the connection terminal part protrudes from the plate part, is smaller than the interval between adjacent connection terminal parts. This is caused due to a configuration in which each connection terminal part is bent (cut and raised) from a state of being parallel to the third plate part.

Depending on the structure on the side of the external device to which the film capacitor is connected, it may be necessary to cause the width in the above-described protruding direction of each connection terminal part to be greater than the interval between the connection terminal part and an adjacent connection terminal part. In such a case, the above-described simple structure in which each connection terminal part is cut and raised cannot be adopted.

SUMMARY OF THE INVENTION

A first mode of the present invention relates to a capacitor. The capacitor according to the present mode includes a capacitor element and a bus bar configured to be connected to an electrode of the capacitor element. Here, the bus bar includes a bus bar body member having a terminal formation part and an electrode terminal part configured to be connected to the electrode, and a terminal formation member formed separately from the bus bar body member and configured to be superposed on and fixed to the terminal formation part. In the terminal formation part, a plurality of first connection terminal parts protruding from a surface of the terminal formation part and configured to be connected to external terminals are formed so as to be arranged in one direction, by portions of the terminal formation part being cut and raised, and first openings are formed in places where the portions have been cut and raised. In the terminal formation member, a plurality of second connection terminal parts protruding from a surface of the terminal formation member and configured to be connected to external terminals are formed so as to be arranged in one direction, by portions of the terminal formation member being cut and raised, and second openings are formed in places where the portions have been cut and raised. The first connection terminal parts and the second connection terminal parts are alternately arranged in one direction, by the first connection terminal parts being passed through the second openings, or by the second connection terminal parts being passed through the first openings.

A second mode of the present invention relates to a method for manufacturing a capacitor including a capacitor element and a bus bar configured to be connected to an electrode of the capacitor element. In the manufacturing method according to the present mode, in a step of forming the bus bar, a bus bar body member that has a terminal formation part and an electrode terminal part configured to be connected to the electrode, and in which, in the terminal formation part, a plurality of first connection terminal parts configured to be connected to external terminals are formed so as to be arranged in one direction, by cutting and raising portions of the terminal formation part, is created, and a terminal formation member which is separate from the bus bar body member and in which a plurality of second connection terminal parts configured to be connected to external terminals are formed so as to be arranged in one direction, by cutting and raising portions of the terminal formation member, is created. Next, the terminal formation part of the bus bar body member and the terminal formation member are superposed with each other such that the first connection terminal parts and the second connection terminal parts are alternately arranged in one direction, by passing the first connection terminal parts through second openings that are open in the terminal formation member as a result of the cutting and raising of the second connection terminal parts, or by passing the second connection terminal parts through first openings that are open in the terminal formation part as a result of the cutting and raising of the first connection terminal parts. Then, the terminal formation part and the terminal formation member superposed with each other are fixed together.

A third mode of the present invention relates to a capacitor. The capacitor according to the present mode includes a capacitor element; and a bus bar configured to be connected to an electrode of the capacitor element. Here, the bus bar includes: a bus bar body member having a terminal formation part and an electrode terminal part configured to be connected to the electrode; and a terminal formation member configured to be superposed on the terminal formation part and fixed thereto by welding. In the terminal formation part, a plurality of first connection terminal parts protruding from a surface of the terminal formation part and configured to be connected to external terminals are formed so as to be arranged in one direction, by portions of the terminal formation part being cut and raised, and first openings are formed in places where the portions have been cut and raised. In the terminal formation member, a plurality of second connection terminal parts protruding from a surface of the terminal formation member and configured to be connected to external terminals are formed so as to be arranged in one direction, by portions of the terminal formation member being cut and raised, and second openings are formed in places where the portions have been cut and raised. The first connection terminal parts and the second connection terminal parts are alternately arranged in one direction, by the first connection terminal parts being passed through the second openings, or by the second connection terminal parts being passed through the first openings. In the bus bar, a plurality of joining points for joining the terminal formation part and the terminal formation member together by welding are provided on the electrode terminal part side with respect to the first openings and the second openings, and in the bus bar body member, third openings are formed in vicinities of the joining points and on the electrode terminal part side with respect to the joining points.

A fourth mode of the present invention relates to a method for manufacturing a capacitor including a capacitor element and a bus bar configured to be connected to an electrode of the capacitor element. The manufacturing method according to the present mode includes a step of forming the bus bar. In the step of forming the bus bar: in a bus bar body member having a terminal formation part and an electrode terminal part configured to be connected to the electrode, a plurality of first connection terminal parts configured to be connected to external terminals are formed, in the terminal formation part, so as to be arranged in one direction, by cutting and raising portions of the terminal formation part, and first openings are formed, in the terminal formation part, in places where the portions have been cut and raised; and in a terminal formation member, a plurality of second connection terminal parts configured to be connected to external terminals are formed so as to be arranged in one direction, by cutting and raising portions of the terminal formation member, and second openings are formed in places where the portions have been cut and raised. Next, the terminal formation part of the bus bar body member and the terminal formation member are superposed with each other such that the first connection terminal parts and the second connection terminal parts are alternately arranged in one direction, by passing the first connection terminal parts through the second openings, or by passing the second connection terminal parts through the first openings. Then, the terminal formation part and the terminal formation member superposed with each other are fixed together by welding. In the bus bar, a plurality of joining points for joining the terminal formation part and the terminal formation member together by welding are provided on the electrode terminal part side with respect to the first openings and the second openings. When the bus bar body member is created, third openings are formed, in the bus bar body member, so as to be positioned in vicinities of the joining points and on the electrode terminal part side with respect to the joining points.

BRIEF DESCRIPTION OF THE DRAWINGS

The above and other objects and new features of the present invention will be fully clarified by the following description of the embodiment, when read in conjunction with accompanying drawings.

FIGS. 5A and 5B are cross-sectional views, of a jig to which a bus bar body member and a terminal formation member have been set, that has been cut at the position of a positioning pin on the right side, and at the position of insertion holes for welding rods, respectively, according to Embodiment 1;

FIGS. 13A and 13B are cross-sectional views, of a jig to which a bus bar body member and a terminal formation member have been set, that has been cut at the position of a positioning pin on the right side, and at the position of insertion holes for welding rods, respectively, according to Embodiment 2;

Figure 1:
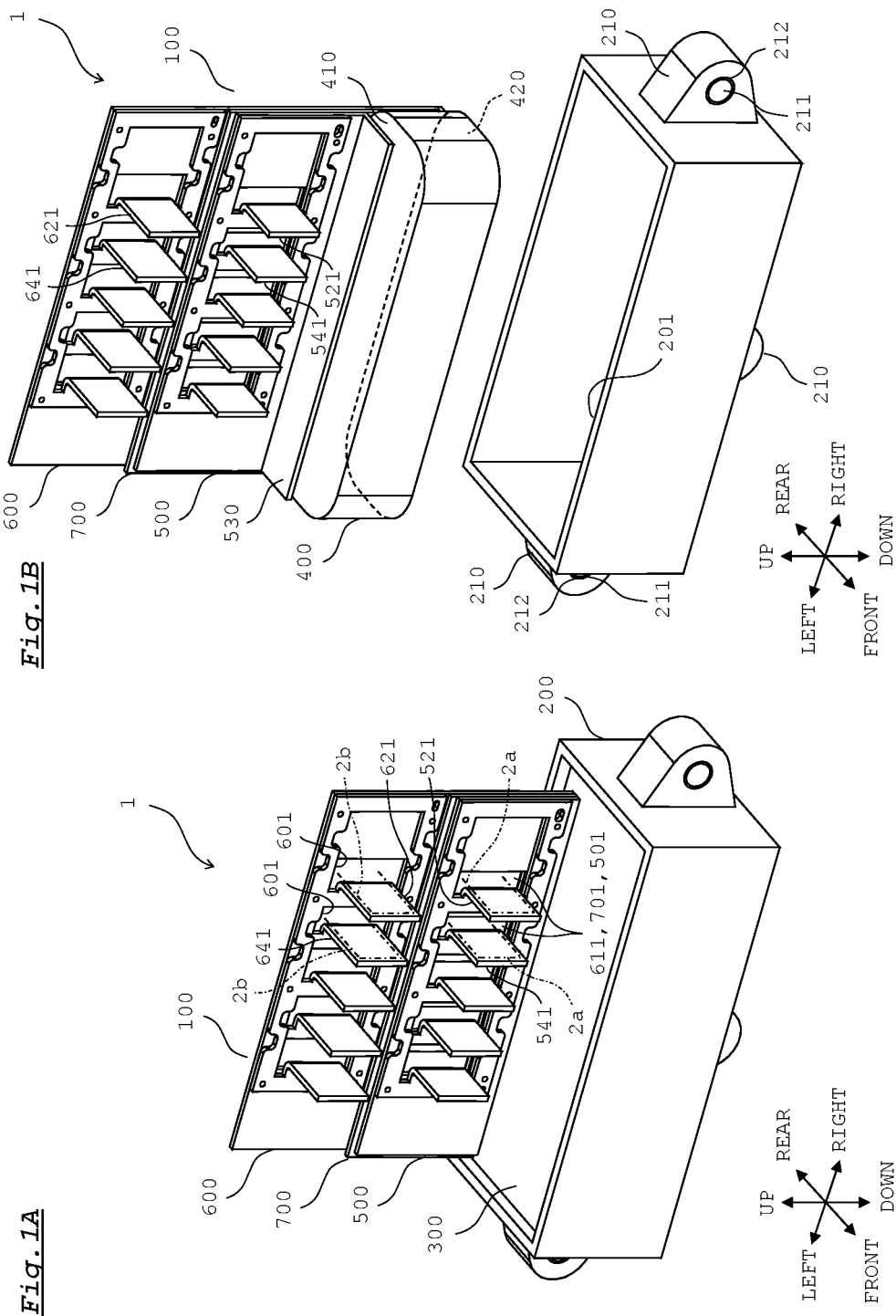
FIG. 1A is a perspective view of a film capacitor according to Embodiment 1.
FIG. 1B is an exploded perspective view of the film capacitor, showing a state before a capacitor element unit is housed in a case according to Embodiment 1.

It should be noted that the drawings are solely for description and do not limit the scope of the present invention by any degree.

DESCRIPTION OF THE PREFERRED EMBODIMENTS

Hereinafter, a film capacitor being an embodiment of a capacitor of the present invention will be described with reference to the drawings. For convenience, front, rear, left, right, up, and down directions are indicated in the drawings, as appropriate. It should be noted that the directions in the drawings merely indicate relative directions with respect to the film capacitor, and do not indicate absolute directions.

Embodiment 1

In Embodiment 1, a film capacitor 1 corresponds to "capacitor" described in claims 1 to 5. A first electrode 410 and a second electrode 420 correspond to "electrode" described in claims 1 to 5. Further, a first bus bar 500 and a second bus bar 600 correspond to "bus bar" described in claims 1 to 5. Further, connection terminal parts 541, 641 correspond to "first connection terminal part" described in claims 1 to 5, and connection terminal parts 521, 621 correspond to "second connection terminal part" described in claims 1 to 5. Further, openings 542, 642 correspond to "first opening" described in claims 1 to 5, and openings 522, 622 correspond to "second opening" described in claims 1 to 5. Further, a pin 811 corresponds to "projection part" described in claims 1 to 5.

However, the above description is merely for providing correspondence between the configurations described in the claims and the configurations of the embodiment. This correspondence does not limit the invention described in the claims to the configurations of the embodiment in any way.

Figure 2:
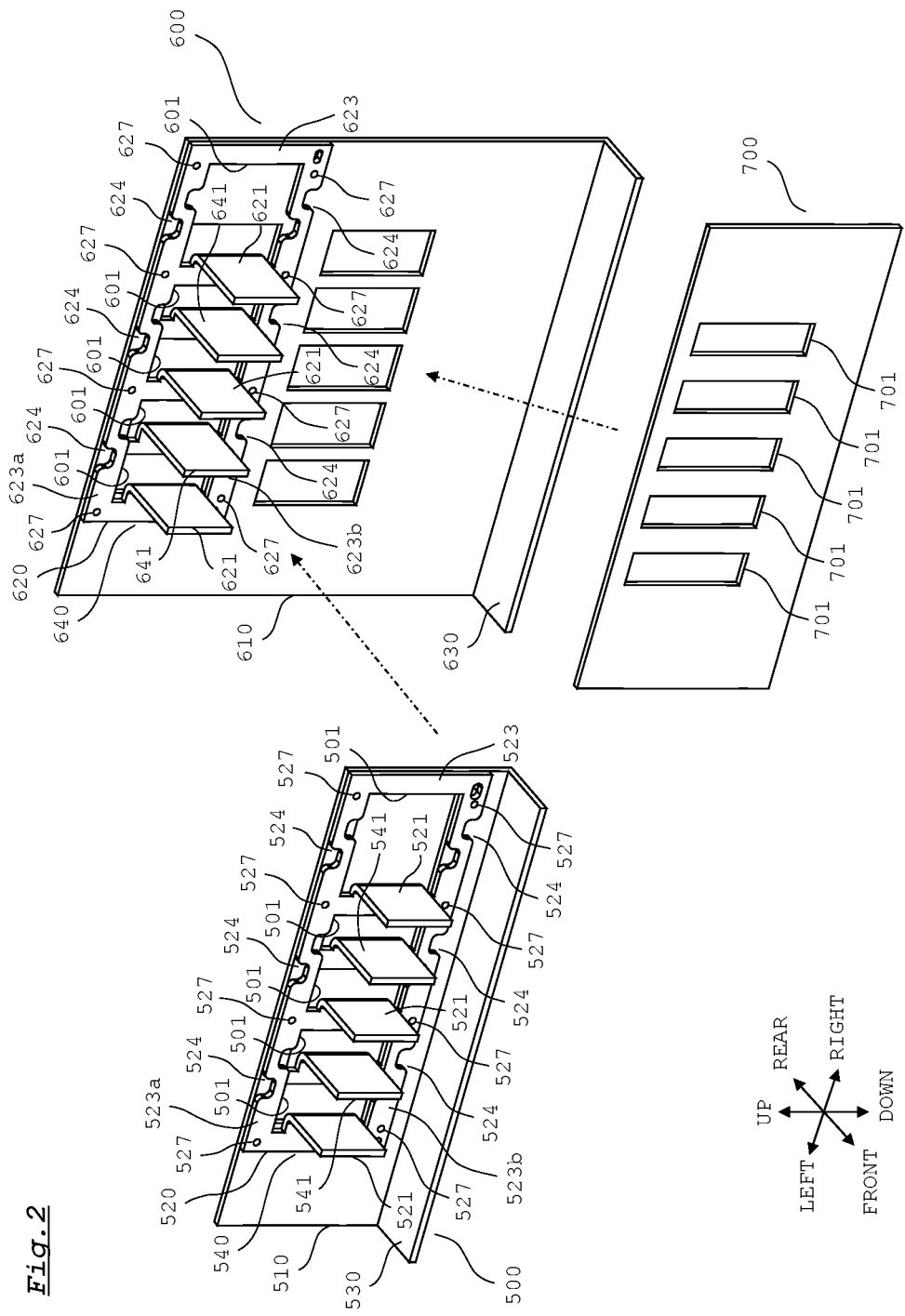
FIG. 2 is a perspective view showing a state where a first bus bar, a second bus bar, and an insulation plate are combined together according to Embodiment 1.
Figure 3:
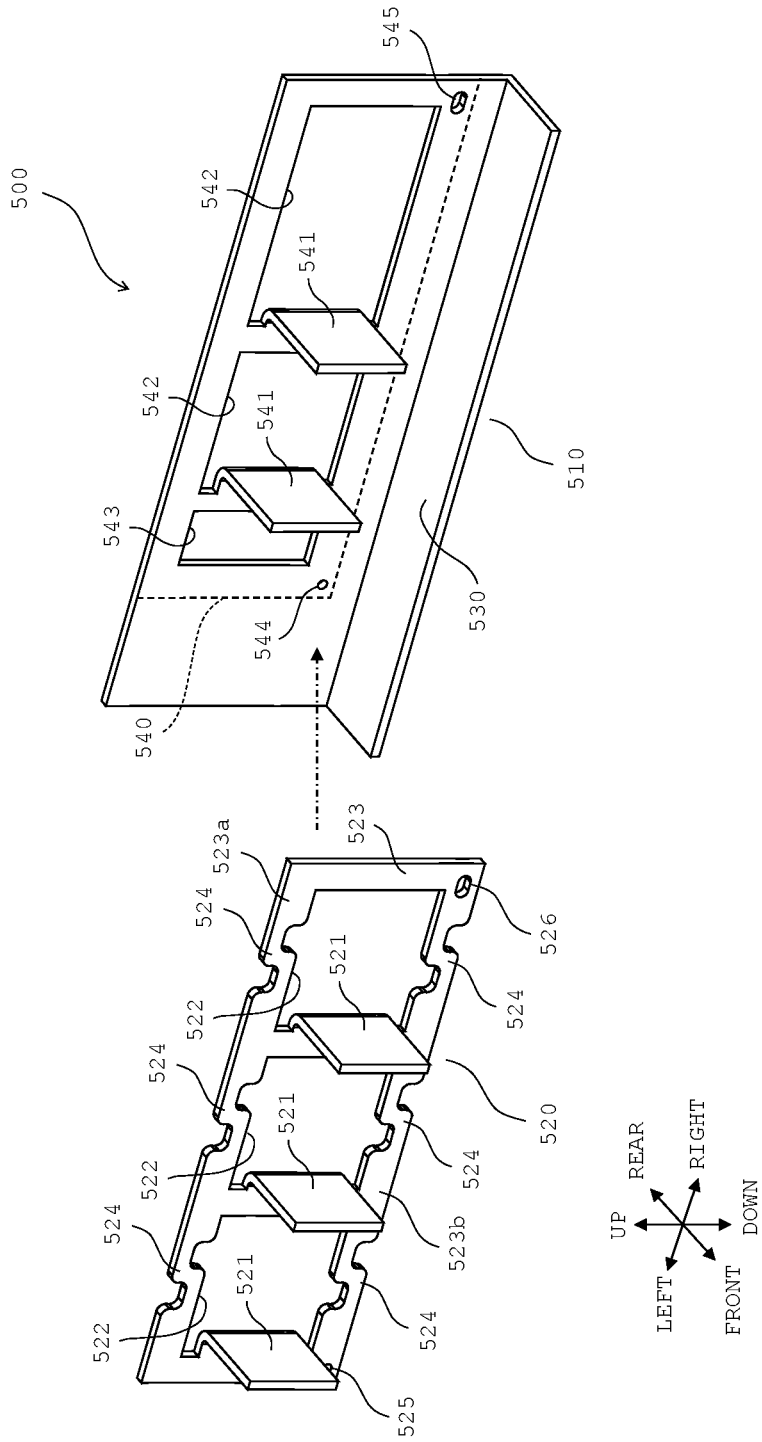
FIG. 3 is an exploded perspective view of the first bus bar according to Embodiment 1.
Figure 4:
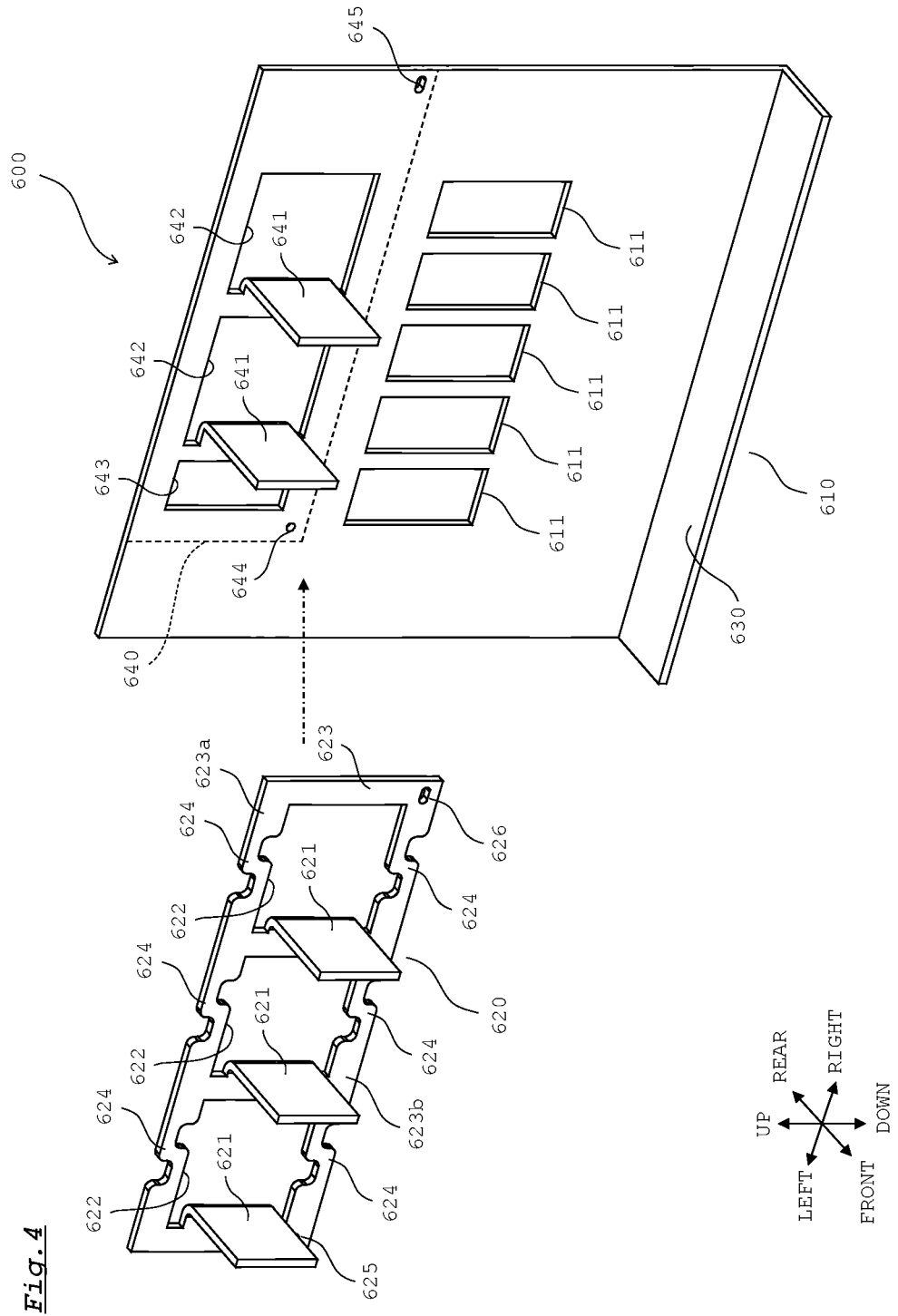
FIG. 4 is an exploded perspective view of the second bus bar according to Embodiment 1.

FIG. 1A is a perspective view of the film capacitor 1 and FIG. 1B is an exploded perspective view of the film capacitor 1, showing a state before a capacitor element unit 100 is housed in a case 200. FIG. 2 is a perspective view showing a state before the first bus bar 500, the second bus bar 600, and an insulation plate 700 are combined together. FIG. 3 is an exploded perspective view of the first bus bar 500. FIG. 4 is an exploded perspective view of the second bus bar 600.

The film capacitor 1 includes: the capacitor element unit 100; the case 200 in which the capacitor element unit 100 is housed; and a filling resin 300 which is filled into the case 200.

The filling resin 300 is a thermosetting resin such as an epoxy resin, is injected in a liquid phase state into the case 200 in which the capacitor element unit 100 is housed, and then hardens as a result of the inside of the case 200 being heated. A big part, of the capacitor element unit 100, that is embedded in the filling resin 300 is protected from humidity and impact.

The capacitor element unit 100 includes a capacitor element 400, the first bus bar 500, the second bus bar 600, and the insulation plate 700.

With reference to FIG. 1B, the capacitor element 400 is formed as follows: two metalized films each obtained by depositing aluminum on a dielectric film are stacked together; and the stacked metalized films are wound or laminated and then pressed into a flat shape. At one end face of the capacitor element 400, the first electrode 410 is formed by spraying a metal such as zinc, and, similarly, at the other end face of the capacitor element 400, the second electrode 420 is formed by spraying a metal such as zinc.

The capacitor element 400 of the present embodiment is formed from the metalized film obtained by depositing aluminum on a dielectric film. However, other than this, the capacitor element 400 may be formed from a metalized film obtained by depositing a metal such as zinc, magnesium, or the like. Alternatively, the capacitor element 400 may be formed from a metalized film obtained by depositing a plurality of metals out of these metals, or may be formed from a metalized film obtained by depositing an alloy of these metals.

With reference to FIG. 2 and FIG. 3, the first bus bar 500 is implemented by a bus bar body member 510 and a terminal formation member 520 formed separately from the bus bar body member 510. The bus bar body member 510 and the terminal formation member 520 are each formed by subjecting a metal plate, e.g., a copper plate, being an electrically conductive material having a predetermined shape, to processing such as cutting and raising, bending, and the like, as appropriate.

The bus bar body member 510 has a shape of a quadrate plate that is long in the left-right direction and of which a lower end portion is substantially perpendicularly bent as an electrode terminal part 530. The bus bar body member 510 is provided with a terminal formation part 540 (indicated by a broken line in FIG. 3) on and to which the terminal formation member 520 is superposed and fixed. In the terminal formation part 540, two connection terminal parts 541 having quadrate shapes are formed so as to be arranged in the left-right direction (one direction), by portions of the terminal formation part 540 being cut and raised.

In the place, of the terminal formation part 540, where each connection terminal part 541 has been cut and raised, an opening 542 having a quadrate shape that is greater than the connection terminal part 541 is formed. As for the opening 542 on the left side, the dimensions in the up-down direction and the left-right direction are slightly greater than the dimensions in the up-down direction and the front-rear direction of the connection terminal part 541 on the left side. Meanwhile, as for the opening 542 on the right side, the dimension in the up-down direction is slightly greater than the dimension in the up-down direction of the connection terminal part 541 on the right side, and the dimension in the left-right direction is significantly greater than the dimension in the front-rear direction of the connection terminal part 541 on the right side. In the terminal formation part 540, an opening 543 having a quadrate shape that is long in the up-down direction is formed to the left of the opening 542 on the left side. Further, in the terminal formation part 540, a hole portion 544 which is circular and a hole portion 545 which is oblong are formed on the left side and the right side, respectively, below the openings 542.

The terminal formation member 520 has a quadrate plate shape that is long in the left-right direction. In the terminal formation member 520, three connection terminal parts 521 having quadrate shapes are formed so as to be arranged in the left-right direction (one direction), by portions of the terminal formation member 520 being cut and raised.

In the place, of the terminal formation member 520, where each connection terminal part 521 has been cut and raised, an opening 522 having a quadrate shape that is greater than the connection terminal part 521 is formed. The dimensions in the up-down direction and the left-right direction of each opening 522 are slightly greater than the dimensions in the up-down direction and the front-rear direction of the connection terminal part 521. In the terminal formation member 520, each of a bar 523a on the upper side and a bar 523b on the lower side of a frame part 523 which is quadrate and surrounds the three openings 522 has formed therein narrow width portions 524 at three places at a predetermined interval. As shown in FIG. 3, each narrow width portion 524 has a waved shape in which the widths of portions close to the portions on both sides of the narrow width portion 524 in the frame part 523 are small. Further, in the terminal formation member 520, a hole portion 525 which is circular and a hole portion 526 which is oblong are formed on the left side and the right side, respectively, below the openings 522.

As shown in FIG. 2, the terminal formation member 520 is superposed on the front face of the terminal formation part 540 of the bus bar body member 510. The left connection terminal part 541 of the terminal formation part 540 is passed through the center opening 522 of the terminal formation member 520, and the right connection terminal part 541 of the terminal formation part 540 is passed through the right-end opening 522 of the terminal formation member 520. The three connection terminal parts 521 and the two connection terminal parts 541 are alternately arranged in the left-right direction (one direction). Due to the overlapping between the openings 542, 543 of the terminal formation part 540 and the openings 522 of the terminal formation member 520, an opening 501 for allowing an external terminal (described later) to pass therethrough is formed on the right side of each connection terminal part 521, 541.

In the frame part 523 of the terminal formation member 520, the bar 523a on the upper side and the bar 523b on the lower side are each provided with joining points 527 at a position of a left end portion, a position of a right end portion, and two positions between the three narrow width portions 524. By welding (spot welding) at these joining points 527, the terminal formation member 520 is fixed to the terminal formation part 540.

With reference to FIG. 2 and FIG. 4, the second bus bar 600 is implemented by a bus bar body member 610, and a terminal formation member 620 formed separately from the bus bar body member 610. The bus bar body member 610 and the terminal formation member 620 are each formed by subjecting a metal plate, e.g., a copper plate, being an electrically conductive material processed into a predetermined shape, to processing such as cutting and raising, bending, and the like, as appropriate.

The bus bar body member 610 has a shape of a quadrate plate that is longer in the up-down direction than the bus bar body member 510 of the first bus bar 500 and of which a lower end portion is substantially perpendicularly bent as an electrode terminal part 630. The bus bar body member 610 is provided with, in an upper portion thereof, a terminal formation part 640 (indicated by a broken line in FIG. 4) on and to which the terminal formation member 620 is superposed and fixed. In the terminal formation part 640, two connection terminal parts 641 having quadrate shapes are formed so as to be arranged in the left-right direction (one direction), by portions of the terminal formation part 640 being cut and raised. The dimension in the front-rear direction of each connection terminal part 641 is greater than the dimension of each connection terminal part 541 of the bus bar body member 510 of the first bus bar 500.

In the place, of the terminal formation part 640, where each connection terminal part 641 has been cut and raised, an opening 642 having a quadrate shape that is greater than the connection terminal part 641 is formed. The dimensions in the up-down direction and the left-right direction of each opening 642 are slightly greater than the dimensions in the up-down direction and the front-rear direction of each connection terminal part 641. In the terminal formation part 640, an opening 643 having a quadrate shape that is long in the up-down direction is formed to the left of the opening 642 on the left side. Further, in the terminal formation part 640, a hole portion 644 which is circular and a hole portion 645 which is oblong are formed on the left side and the right side, respectively, below the openings 642.

Further, in the bus bar body member 610 and below the terminal formation part 640, five openings 611 having quadrate shapes and corresponding to the five openings 501 of the first bus bar 500 are formed so as to be arranged in the left-right direction.

The terminal formation member 620 has a configuration similar to that of the terminal formation member 520 of the first bus bar 500, and includes three connection terminal parts 621 and three openings 622. The dimension in the front-rear direction of each connection terminal part 621 is greater than the dimension of each connection terminal part 521 of the terminal formation member 520 of the first bus bar 500. In the terminal formation member 620, each of a bar 623a on the upper side and a bar 623b on the lower side of a frame part 623 has formed therein three narrow width portions 624. Further, in the terminal formation member 620, a hole portion 625 which is circular and a hole portion 626 which is oblong are formed.

As shown in FIG. 2, the terminal formation member 620 is superposed on the front face of the terminal formation part 640 of the bus bar body member 610. The left connection terminal part 641 of the terminal formation part 640 is passed through the center opening 622 of the terminal formation member 620, and the right connection terminal part 641 of the terminal formation part 640 is passed through the right-end opening 622 of the terminal formation member 620. The three connection terminal parts 621 and the two connection terminal parts 641 are alternately arranged in the left-right direction (one direction). Due to the overlapping between the openings 642, 643 of the terminal formation part 640 and the openings 622 of the terminal formation member 620, an opening 601 for allowing an external terminal (described later) to pass therethrough is formed on the right side of each connection terminal part 621, 641.

In the frame part 623 of the terminal formation member 620, the bar 623a on the upper side and the bar 623b on the lower side are each provided with joining points 627 at a position of a left end portion, a position of a right end portion, and two positions between the three narrow width portions 624. By welding (spot welding) at these joining points 627, the terminal formation member 620 is fixed to the terminal formation part 640.

With reference to FIG. 2, the insulation plate 700 is formed from a resin such as polyphenylene sulfide (PPS), and has a quadrate shape that is long in the left-right direction. In the insulation plate 700, five openings 701 having quadrate shapes and corresponding to the five openings 501 of the first bus bar 500 are formed so as to be arranged in the left-right direction.

When the capacitor element unit 100 is to be assembled, first, the first bus bar 500 is superposed, from the front, on the second bus bar 600 with the insulation plate 700 therebetween, such that a terminal row composed of the three connection terminal parts 521 and the two connection terminal part 541 is positioned below a terminal row composed of the three connection terminal parts 621 and the two connection terminal parts 641. Accordingly, a state where the five openings 501 of the first bus bar 500, the five openings 701 of the insulation plate 700, and the five openings 611 of the second bus bar 600 overlap each other in the front-rear direction, is established. In addition, a state where the front end positions of the three connection terminal parts 521 and the two connection terminal parts 541 of the first bus bar 500 and the front end positions of the three connection terminal parts 621 and the two connection terminal parts 641 of the second bus bar 600 are aligned with each other, is established.

Next, the first bus bar 500 and the second bus bar 600 are connected to the capacitor element 400. That is, the electrode terminal part 530 of the first bus bar 500 is joined to the first electrode 410 of the capacitor element 400 by a joining method such as soldering. Accordingly, the first bus bar 500 is electrically connected to the first electrode 410. Similarly, the electrode terminal part 630 of the second bus bar 600 is joined to the second electrode 420 of the capacitor element 400 by a joining method such as soldering. Accordingly, the second bus bar 600 is electrically connected to the second electrode 420.

As a result, the capacitor element unit 100 is completed as shown in FIG. 1B.

With reference to FIG. 1B, the case 200 is made of resin, and is formed from polyphenylene sulfide (PPS) being a thermoplastic resin, for example. The case 200 is formed in a substantially rectangular parallelepiped box shape, and has an opening 201 at the upper face thereof.

In the case 200, a mounting tab 210 is provided to each of the left and right outer side faces and the outer bottom face. Each mounting tab 210 has formed therein an insertion hole 211 penetrating the mounting tab 210 in the front-rear direction. A collar 212 made of metal is fitted in the insertion hole 211 in order to increase the strength of the hole. When the film capacitor 1 is set to a setting part of an external device or the like, these mounting tabs 210 are fixed to the setting part by screws or the like.

The capacitor element unit 100 is housed through the opening 201 into the case 200. The filling resin 300 in a liquid phase state is injected through the opening 201 into the case 200 in which the capacitor element unit 100 is housed. When the filling resin 300 has been filled into the case 200 up to the vicinity of the opening 201, and injection of the filling resin 300 is completed, the case 200 is heated. Accordingly, the filling resin 300 in the case 200 hardens. As a result, the film capacitor 1 as shown in FIG. 1A is completed.

The film capacitor 1 is mounted to an external device or the like. The external device or the like is provided with five external terminals 2a on the positive electrode side and five external terminals 2b on the negative electrode side, the external terminals 2a, 2b being in the form of bus bars, for example. For example, when the first bus bar 500 is the bus bar on the positive electrode side, and the second bus bar 600 is the bus bar on the negative electrode side, the five external terminals 2a pass through the three kinds of openings 611, 701, 501 overlapping each other in the front-rear direction, to come into contact with the five connection terminal parts 521, 541 of the first bus bar 500, and are connected to the connection terminal parts 521, 541 by a joining method such as soldering. Further, the five external terminals 2b pass through the openings 601 to come into contact with the five connection terminal parts 621, 641 of the second bus bar 600, and are connected to the connection terminal parts 621, 641 by a joining method such as soldering.

Next, a method for manufacturing the first bus bar 500 and the second bus bar 600 is described. The first bus bar 500 and the second bus bar 600 are each formed through a bus bar forming step.

In the bus bar forming step, first, a metal plate having a predetermined shape is subjected to processing such as cutting and raising, bending, and the like, as appropriate, thereby creating the bus bar body member 510 and the terminal formation member 520 of the first bus bar 500. The bus bar body member 510 has the electrode terminal part 530 and the terminal formation part 540, and in the terminal formation part 540, the two connection terminal parts 541 are formed so as to be arranged in one direction, by cutting and raising portions of the terminal formation part 540. In the terminal formation member 520, the three connection terminal parts 521 are formed so as to be arranged in one direction, by cutting and raising portions of the terminal formation member 520. Further, in a manner similar to the above, the bus bar body member 610 and the terminal formation member 620 of the second bus bar 600 are created.

Next, using a dedicated jig 3, the terminal formation member 520 is joined and fixed to the bus bar body member 510, to form the first bus bar 500.

FIGS. 5A and 5B are cross-sectional views, of the jig 3 to which the bus bar body member 510 and the terminal formation member 520 have been set, that has been cut at the position of a positioning pin 811 on the right side, and at the position of insertion holes 813, 822 for welding rods 841, 842, respectively.

The jig 3 includes: a placement base 810 on which the bus bar body member 510 and the terminal formation member 520 are set (placed); and a pressing plate 820 which presses the bus bar body member 510 and the terminal formation member 520 set on the placement base 810. The placement base 810 is provided with, at two places at left and right of the setting face thereof, positioning pins 811 which correspond to the left and right hole portions 544, 545 of the bus bar body member 510 and the left and right hole portions 525, 526 of the terminal formation member 520. In addition, the placement base 810 has formed therein five recessed portions 812 for housing the two connection terminal parts 541 of the bus bar body member 510 and the three connection terminal parts 521 of the terminal formation member 520. Further, in each of the placement base 810 and a base 830 which supports the placement base 810, insertion holes 813 for allowing passage therethrough of the welding rods 841 on the lower side are formed at eight positions corresponding to the eight joining points 527 of the terminal formation member 520.

At two places, at left and right, of the pressing plate 820, hole portions 821 for accommodating leading end portions of the pins 811 of the placement base 810 are formed. In addition, in the pressing plate 820, insertion holes 822 for allowing passage therethrough of the welding rods 842 on the upper side are formed at eight positions corresponding to the eight joining points 527 of the terminal formation member 520.

When the terminal formation member 520 is to be joined and fixed to the bus bar body member 510, first, the terminal formation member 520 is set to the placement base 810 of the jig 3. At this time, the left and right pins 811 of the placement base 810 are inserted into the left and right hole portions 525, 526 of the terminal formation member 520. Next, the bus bar body member 510 is set to the placement base 810. At this time, the left and right pins 811 of the placement base 810 are inserted into the left and right hole portions 544, 545 of the terminal formation part 540 of the bus bar body member 510. Accordingly, as shown in FIG. 5A, on the placement base 810, the terminal formation part 540 and the terminal formation member 520 are superposed with each other. The two connection terminal parts 541 of the terminal formation part 540 are passed through the two openings 522 of the terminal formation member 520, whereby the two connection terminal parts 541 and the three connection terminal parts 521 are alternately arranged in one direction. In addition, the terminal formation part 540 and the terminal formation member 520 are superposed with each other such that their hole portions 544, 525 (545, 526) are aligned with each other, and a pin 811 of the jig 3 is passed through the two hole portions 544, 525 (545, 526) that have been aligned, whereby a state where positioning thereof has been realized is established. Then, the bus bar body member 510 and the terminal formation member 520 set on the placement base 810 are pressed by the pressing plate 820.

Next, as shown in FIG. 5B, the eight welding rods 841 on the lower side are passed through the eight insertion holes 813 of the placement base 810, and their leading ends are applied to the terminal formation member 520. In addition, the eight welding rods 842 on the upper side are passed through the eight insertion holes 822 of the pressing plate 820, and their leading ends are applied to the terminal formation part 540 of the bus bar body member 510. Welding by the eight welding rods 841 on the lower side and welding by the eight welding rods 842 on the upper side are performed, whereby the terminal formation member 520 is fixed to the terminal formation part 540 at the joining points 527 at the eight places. For example, fiber laser welding can be performed as the welding.

Here, as shown in FIG. 2, between adjacent two joining points 527 in the frame part 523 of the terminal formation member 520, a narrow width portion 524 having a narrower width than the portions where the joining points 527 are provided, is provided. Accordingly, during the welding, heat is easily blocked by the narrow width portion 524 and heat conduction from the vicinities of the joining points 527 is reduced, and thus, the amount of heat inputted to the joining points 527 can be reduced. Accordingly, during the welding, high temperatures of the vicinities of the joining points 527 are less likely to occur, and thus, distortion is less likely to occur in the terminal formation member 520, and accordingly, distortion is less likely to occur in the first bus bar 500.

In a manner similar to that for the first bus bar 500, using the dedicated jig 3, the terminal formation member 620 is joined and fixed to the bus bar body member 610, whereby the second bus bar 600 is formed.

Effects of Embodiment 1

According to the present embodiment, the following effects are exhibited.

The film capacitor 1 includes: the capacitor element 400; and the first bus bar 500 and the second bus bar 600 which are connected to the first electrode 410 and the second electrode 420 of the capacitor element 400. Here, the first bus bar 500 and the second bus bar 600 include: the electrode terminal part 530, 630 connected to the electrode 410, 420; the bus bar body member 510, 610 having the terminal formation part 540, 640 and the electrode terminal part 530, 630 connected to the electrode 410, 420, and the terminal formation member 520, 620 formed separately from the bus bar body member 510, 610 and superposed on and fixed to the terminal formation part 540, 640. In the terminal formation part 540, 640, a plurality of connection terminal parts 541, 641 protruding from the surface of the terminal formation part 540, 640 and to be connected to the external terminals 2a, 2b are formed so as to be arranged in one direction, by portions of the terminal formation part 540, 640 being cut and raised, and the openings 542, 642 are formed in the places where the portions have been cut and raised. In the terminal formation member 520, 620, a plurality of connection terminal parts 521, 621 protruding from the surface of the terminal formation member 520, 620 and to be connected to the external terminals 2a, 2b are formed so as to be arranged in one direction, by portions of the terminal formation member 520, 620 being cut and raised, and the openings 522, 622 are formed in the places where the portions have been cut and raised. Then, the connection terminal parts 541, 641 are passed through the openings 522, 622, whereby the connection terminal parts 541, 641 and the connection terminal parts 521, 621 are alternately arranged in one direction.

With this configuration, in the first bus bar 500 and the second bus bar 600, when a plurality of connection terminal parts 521, 541, 621, 641 arranged in one direction are formed by cutting and raising, the width in the direction (the front-rear direction) protruding from the surface of the bus bar 500, 600 of the connection terminal parts 521, 541, 621, 641 can be made greater than the interval at which the plurality of connection terminal parts 521, 541, 621, 641 are arranged. Accordingly, without being restricted by the interval at which the plurality of connection terminal parts 521, 541, 621, 641 are arranged, it is possible to easily prepare the first bus bar 500 and the second bus bar 600 that have connection terminal parts 521, 541, 621, 641 having sufficient widths in the protruding direction, in accordance with the connection relationship with an external device or the like. In addition, as for the first bus bar 500 and the second bus bar 600, since the frame parts 523, 623 of the terminal formation members 520, 620 are superposed on the peripheries of the openings 542, 642 of the terminal formation parts 540, 640, the peripheral portions of the plurality of connection terminal parts 521, 541, 621, 641 are reinforced. Therefore, breakage and deformation are less likely to occur in the plurality of connection terminal parts 521, 541, 621, 641.

In the terminal formation member 520, 620, the frame part 523, 623 surrounding the openings 522, 622 is provided with, at a predetermined interval, a plurality of joining points 527, 627 at which the terminal formation member 520, 620 are joined to the terminal formation part 540, 640 by welding. Between adjacent two joining points 527, 627 in the frame part 523, 623, a narrow width portion 524, 624 having a narrower width than the portions where the joining points 527, 627 are provided, is provided.

With this configuration, during the welding, high temperatures of the vicinities of the joining points 527, 627 are less likely to occur, and thus, distortion is less likely to occur in the terminal formation members 520, 620, and accordingly, distortion is less likely to occur in the first bus bar 500 and the second bus bar 600.

Further, the terminal formation part 540 (640) has formed therein the two hole portions 544, 545 (644, 645), the terminal formation member 520 (620) has formed therein the two hole portions 525, 526 (625, 626), and the terminal formation part 540 (640) and the terminal formation member 520 (620) are superposed with each other such that the hole portions 544, 545 (644, 645) and the hole portions 525, 526 (625, 626) are aligned with each other. Then, the pins 811 provided to the jig 3 are passed through the aligned hole portions 544, 545 (644, 645) and hole portions 525, 526 (625, 626), whereby positioning between the terminal formation part 540 (640) and the terminal formation member 520 (620) is realized.

With this configuration, the terminal formation member 520, 620 can be accurately fixed to the terminal formation part 540, 640.

Although Embodiment 1 of the present invention has been described above, the present invention is not limited to Embodiment 1 above, and various application examples of the present invention can be made in addition to Embodiment 1 above.

Modification of Embodiment 1

Figure 6A:
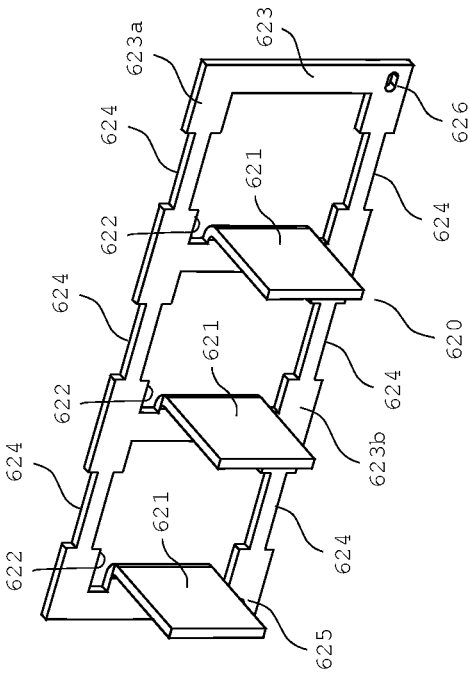
FIGS. 6A and 6B are perspective views of a terminal formation member of the first bus bar, and a terminal formation member of the second bus bar, respectively, according to a modification of Embodiment 1.
Figure 6B:
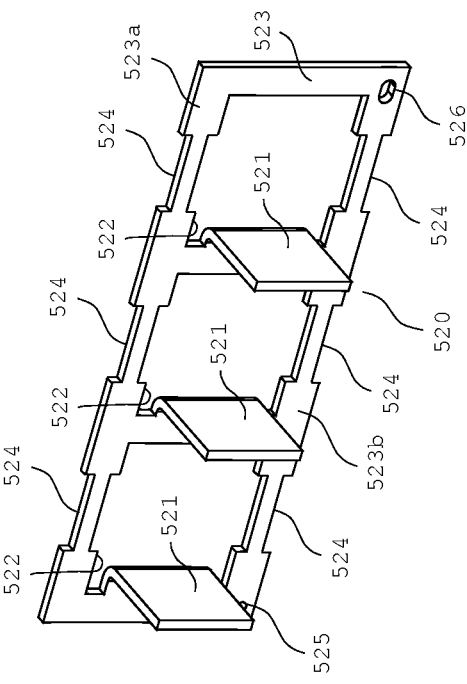

In Embodiment 1 above, each narrow width portion 524 provided to the frame part 523 of the terminal formation member 520 of the first bus bar 500 has a waved shape in which the widths of portions close to the portions on both sides of the narrow width portion 524 in the frame part 523 are small. However, the shape of the narrow width portion 524 is not limited to the above shape. For example, as shown in FIG. 6A, the narrow width portion 524 may have a linear shape. Similarly, each narrow width portion 624 provided to the frame part 623 of the terminal formation member 620 of the second bus bar 600 may not necessarily have a waved shape, and may have a linear shape as shown in FIG. 6B. However, in a case where the narrow width portion 524, 624 has a waved shape, when compared with a case of a linear shape, the heat conduction path (the path at the narrow width portion) can be made long. Therefore, heat is more easily blocked, and temperature rise in the vicinities of the welding points (joining points) can be easily suppressed.

Figure 6C:
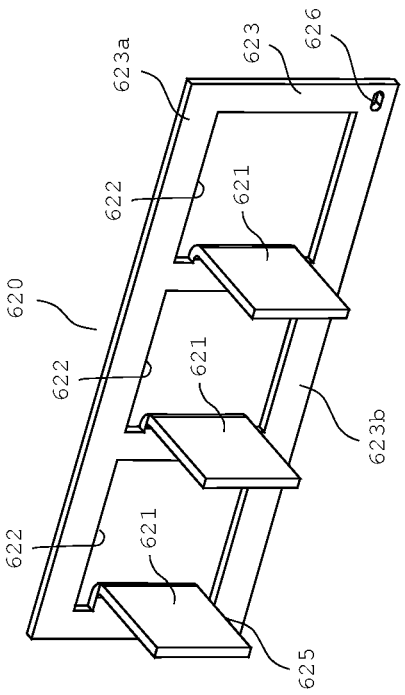
FIGS. 6C and 6D are perspective views of a terminal formation member of the first bus bar, and a terminal formation member of the second bus bar, respectively, according to a modification of Embodiment 1.
Figure 6D:
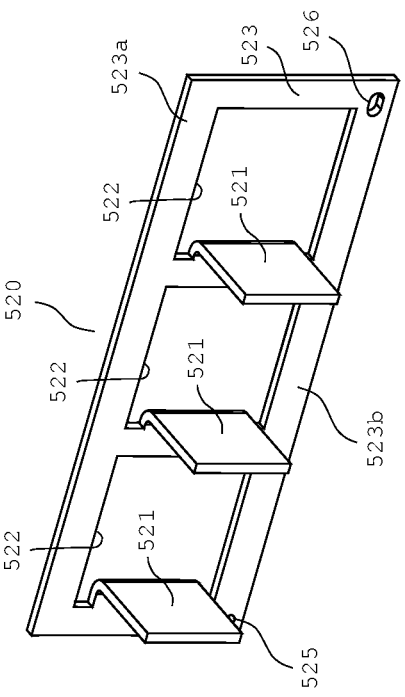

As shown in FIG. 6C, a narrow width portion 524 need not be provided to the frame part 523 of the terminal formation member 520 of the first bus bar 500. Similarly, a narrow width portion 624 need not be provided to the frame part 623 of the terminal formation member 620 of the second bus bar 600.

Further, in Embodiment 1 above, the narrow width portions 524, 624 may also be provided to the left-side bar and the right-side bar of the frame part 523, 623 of the terminal formation member 520, 620.

Figure 7:
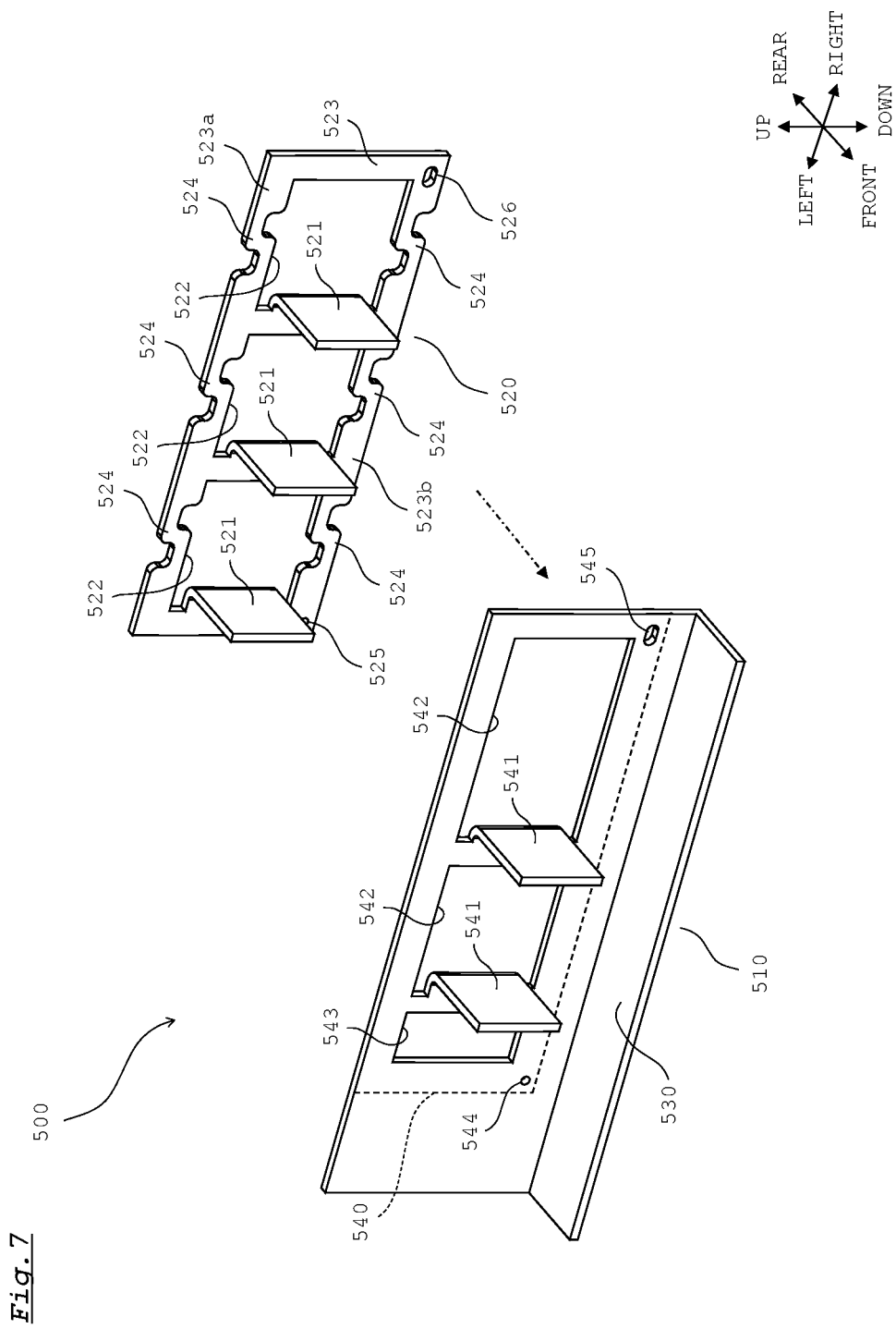
FIG. 7 is an exploded perspective view of a first bus bar according to another modification of Embodiment 1.
Figure 8:
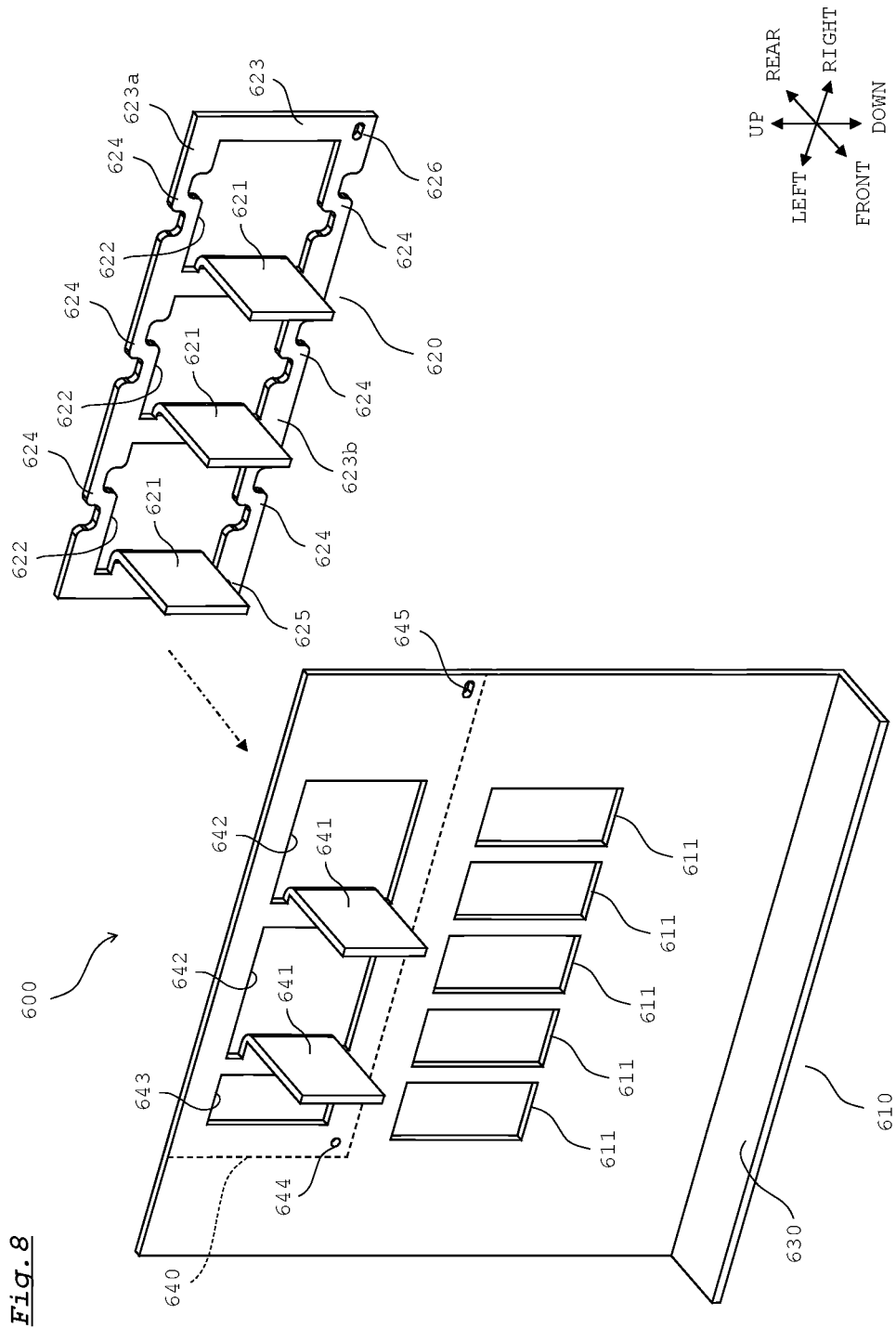
FIG. 8 is an exploded perspective view of a second bus bar according to another modification of Embodiment 1.

Further, in Embodiment 1 above, the first bus bar 500 and the second bus bar 600 are configured such that: the connection terminal parts 541, 641 of the terminal formation part 540, 640 of the bus bar body member 510, 610 are passed through the openings 522, 622 of the terminal formation member 520, 620, whereby the connection terminal parts 541, 641 of the terminal formation part 540, 640 and the connection terminal parts 521, 621 of the terminal formation member 520, 620 are alternately arranged. However, conversely, as shown in FIG. 7 and FIG. 8, the first bus bar 500 and the second bus bar 600 may be configured such that: the connection terminal parts 521, 621 of the terminal formation member 520, 620 are passed through the openings 542, 642 of the terminal formation part 540, 640, whereby the connection terminal parts 541, 641 of the terminal formation part 540, 640 and the connection terminal parts 521, 621 of the terminal formation member 520, 620 are alternately arranged.

Embodiment 2

In Embodiment 2, a film capacitor 1A corresponds to "capacitor" described in claims 6 to 9. The first electrode 410 and the second electrode 420 correspond to "electrode" described in claims 6 to 9. Further, a first bus bar 500A and a second bus bar 600A correspond to a "bus bar" described in claims 6 to 9. Further, connection terminal parts 581, 681 correspond to "first connection terminal part" described in claims 6 to 9, and connection terminal parts 561, 661 correspond to "second connection terminal part" described in claims 6 to 9. Further, openings 582, 682 correspond to "first opening" described in claims 6 to 9, and openings 562, 662 correspond to "second opening" described in claims 6 to 9. Further, openings 551, 652 correspond to "third opening" described in claims 6 to 9.

However, the above description is merely for providing correspondence between the configurations described in the claims and the configurations of the embodiment. This correspondence does not limit the invention described in the claims to the configurations of the embodiment in any way.

In the film capacitor 1A of Embodiment 2, configurations that are the same as those of the film capacitor 1 of Embodiment 1 above are denoted by the same reference characters, and description thereof is omitted.

Figure 9:
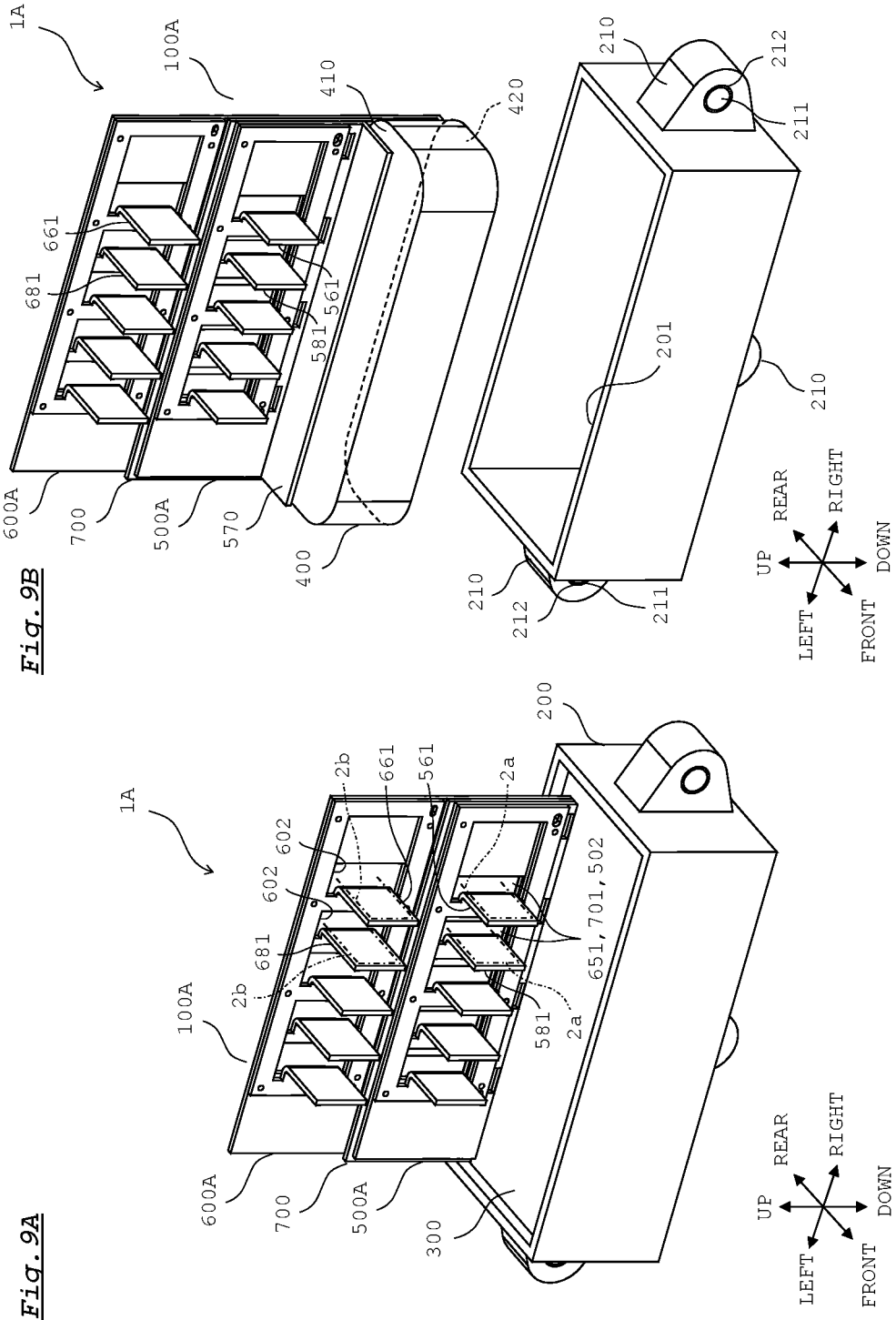
FIG. 9A is a perspective view of a film capacitor according to Embodiment 2.
FIG. 9B is an exploded perspective view of the film capacitor, showing a state before a capacitor element unit is housed in a case according to Embodiment 2.
Figure 10:
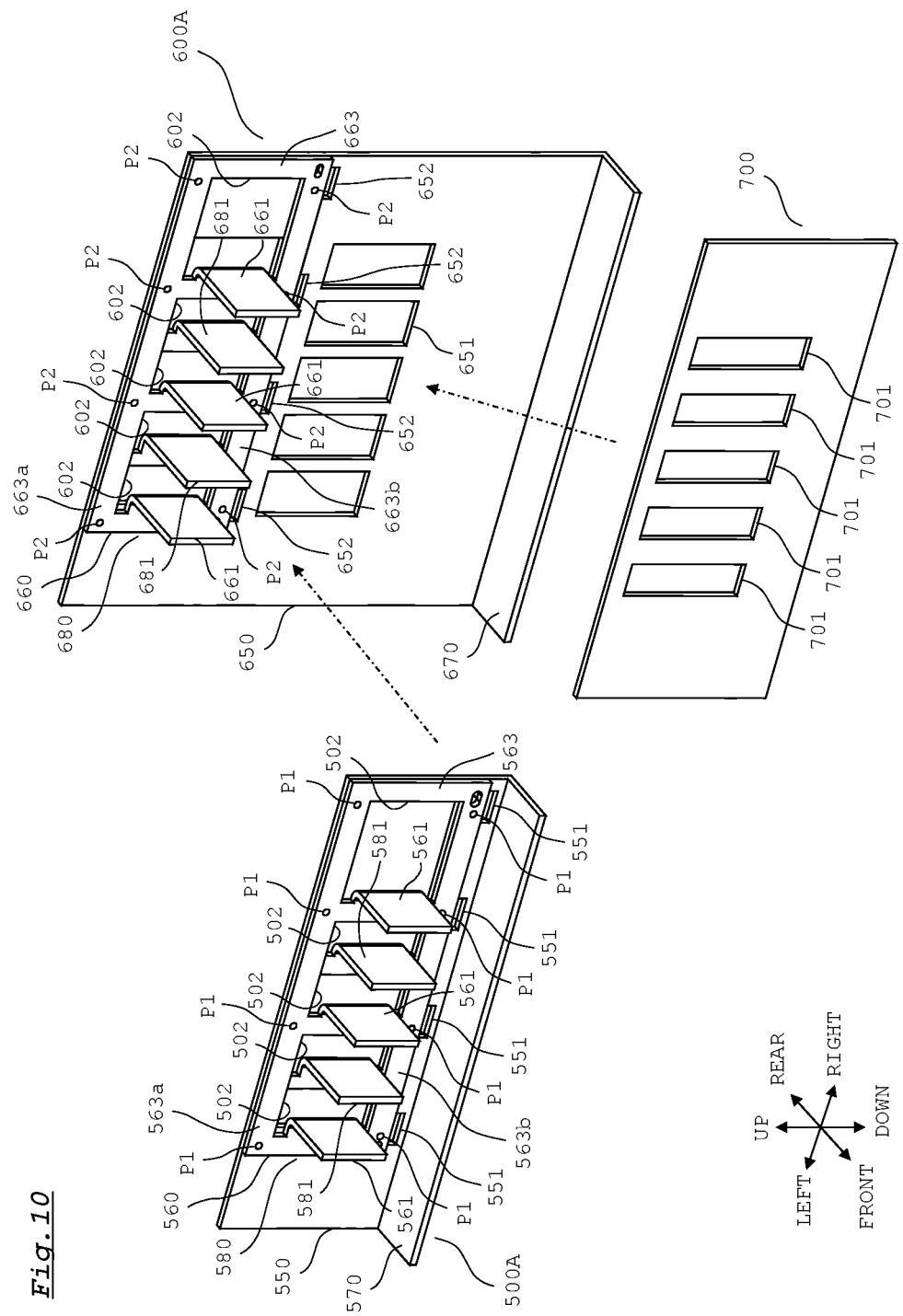
FIG. 10 is a perspective view showing a state before a first bus bar, a second bus bar, and an insulation plate are combined together according to Embodiment 2.
Figure 11:
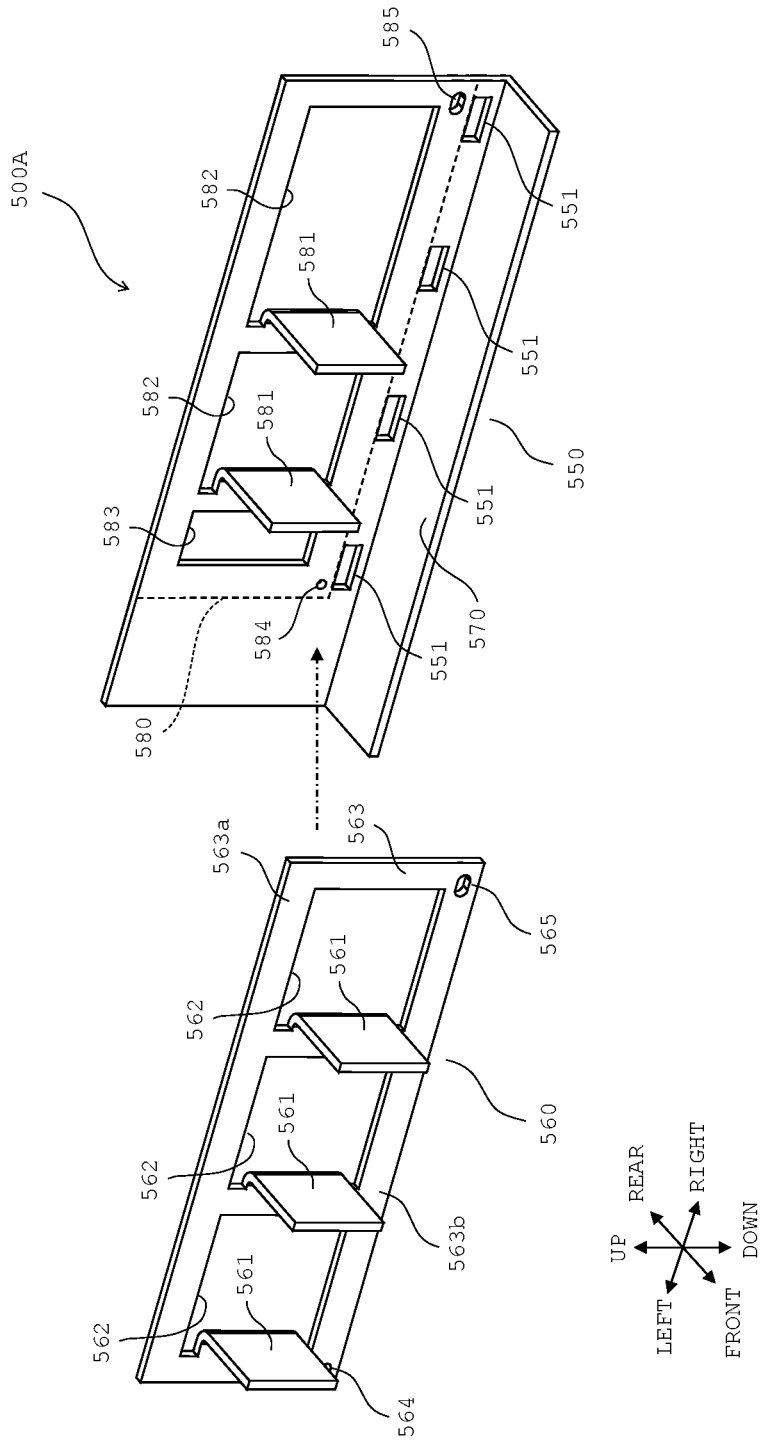
FIG. 11 is an exploded perspective view of the first bus bar according to Embodiment 2.
Figure 12:
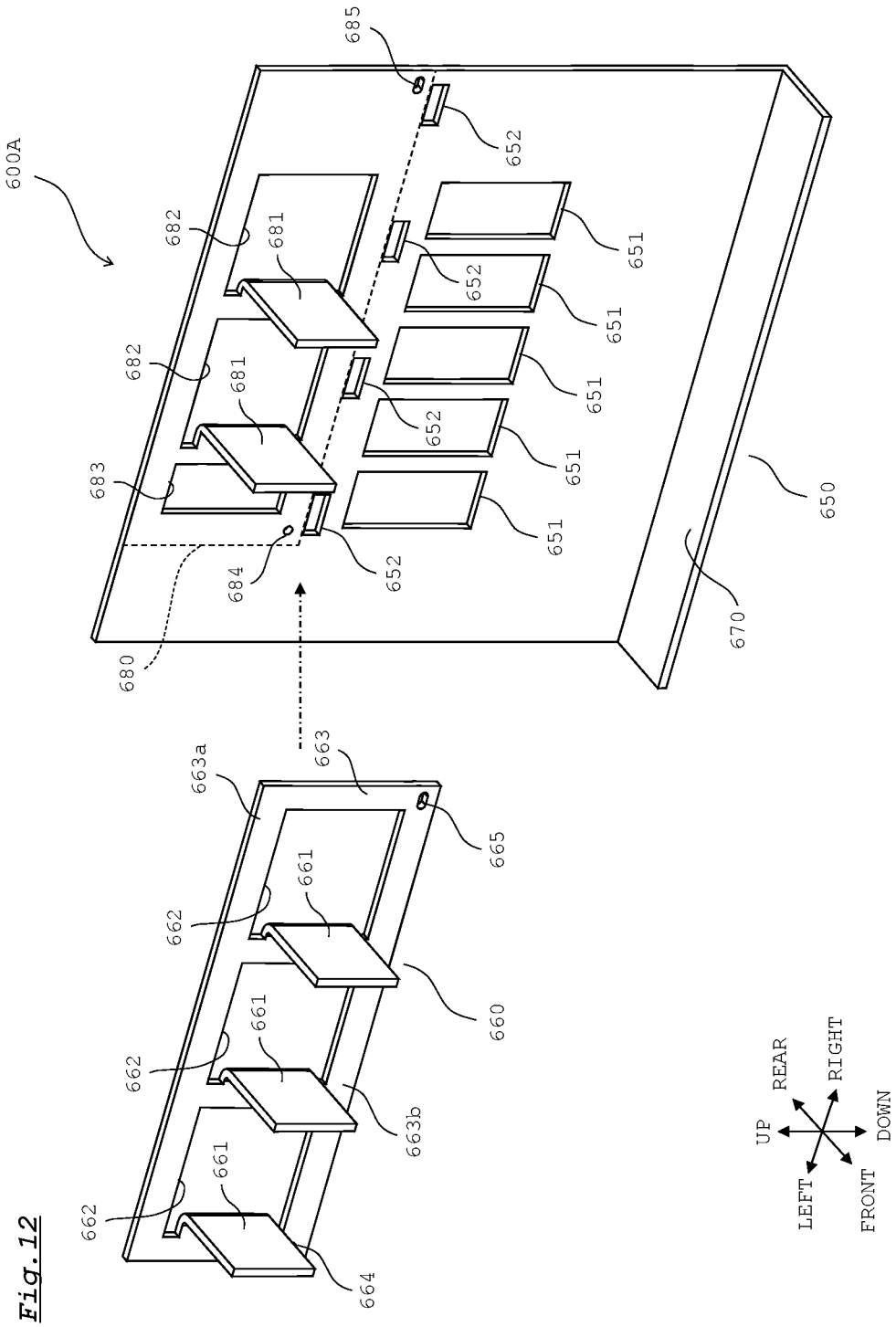
FIG. 12 is an exploded perspective view of the second bus bar according to Embodiment 2.

FIG. 9A is a perspective view of the film capacitor 1A, and FIG. 9B is an exploded perspective view of the film capacitor 1A, showing a state before a capacitor element unit 100A is housed in the case 200. FIG. 10 is a perspective view showing a state before the first bus bar 500A, the second bus bar 600A, and an insulation plate 700 are combined together. FIG. 11 is an exploded perspective view of the first bus bar 500A. FIG. 12 is an exploded perspective view of the second bus bar 600A.

The film capacitor 1A includes: the capacitor element unit 100A; the case 200 in which the capacitor element unit 100A is housed; and a filling resin 300 which is filled into the case 200.

The capacitor element unit 100A includes a capacitor element 400, the first bus bar 500A, the second bus bar 600A, and the insulation plate 700.

With reference to FIG. 10 and FIG. 11, The first bus bar 500A is implemented by a bus bar body member 550, and a terminal formation member 560 formed separately from the bus bar body member 550. The bus bar body member 550 and the terminal formation member 560 are each formed by subjecting a metal plate, e.g., a copper plate, being an electrically conductive material having a predetermined shape, to processing such as cutting and raising, bending, and the like, as appropriate.

The bus bar body member 550 has a shape of a quadrate plate that is long in the left-right direction and of which a lower end portion is substantially perpendicularly bent as an electrode terminal part 570. The bus bar body member 550 is provided with a terminal formation part 580 (indicated by a broken line in FIG. 11) on and to which the terminal formation member 560 is superposed and fixed. In the terminal formation part 580, two connection terminal parts 581 having quadrate shapes are formed so as to be arranged in the left-right direction (one direction), by portions of the terminal formation part 580 being cut and raised.

In the place, of the terminal formation part 580, where each connection terminal part 581 has been cut and raised, an opening 582 having a quadrate shape that is greater than the connection terminal part 581 is formed. As for the opening 582 on the left side, the dimension in the up-down direction and the left-right direction are slightly greater than the dimensions in the up-down direction and the front-rear direction of the connection terminal part 581 on the left side. Meanwhile, as for the opening 582 on the right side, the dimension in the up-down direction is slightly greater than the dimension in the up-down direction of the connection terminal part 581 on the right side, and the dimension in the left-right direction is significantly greater than the dimension in the front-rear of the connection terminal part 581 on the right side. In the terminal formation part 580, an opening

583 having a quadrate shape that is long in the up-down direction is formed to the left of the opening 582 on the left side. Further, in the terminal formation part 580, a hole portion 584 which is circular and a hole portion 585 which is oblong are formed on the left side and the right side, respectively, below the openings 582.

Further, in the bus bar body member 550 and below the terminal formation part 580, four openings 551 are formed so as to be along the direction (the left-right direction) in which the connection terminal parts 581 are arranged. Each opening 551 has a quadrate shape that is long in the left-right direction, and the upper edge thereof is in contact with the lower edge of the terminal formation part 580. Therefore, when the terminal formation member 560 has been fixed to the terminal formation part 580, the upper edge of each opening 551 comes into contact with the lower edge of the terminal formation member 560.

The terminal formation member 560 has a quadrate plate shape that is long in the left-right direction. In the terminal formation member 560, three connection terminal parts 561 are formed so as to be arranged in the left-right direction (one direction), by portions of the terminal formation member 560 being cut and raised.

In the place, of the terminal formation member 560, where each connection terminal part 561 has been cut and raised, an opening 562 having a quadrate shape that is greater than the connection terminal part 561 is formed. The dimensions in the up-down direction and the left-right direction of each opening 562 is slightly greater than the dimensions in the up-down direction and the front-rear direction of the connection terminal part 561. As for the terminal formation member 560, in a frame part 563 which is quadrate and surrounds the three opening 562, a hole portion 564 which is circular and a hole portion 565 which is oblong are formed on the left side and the right side, respectively, below the openings 562.

As shown in FIG. 10, the terminal formation member 560 is superposed on the front face of the terminal formation part 580 of the bus bar body member 550. The left connection terminal part 581 of the terminal formation part 580 is passed through the center opening 562 of the terminal formation member 560, and the right connection terminal part 581 of the terminal formation part 580 is passed through the right-end opening 562 of the terminal formation member 560. The three connection terminal parts 561 and the two connection terminal parts 581 are alternately arranged in the left-right direction (one direction). Due to the overlapping between the openings 582, 583 of the terminal formation part 580 and the openings 562 of the terminal formation member 560, an opening 502 for allowing an external terminal (described later) to pass therethrough is formed on the right side of each connection terminal part 561, 581.

The terminal formation member 560 is fixed to the terminal formation part 580 by welding (spot welding). In the first bus bar 500A, joining points P1 for joining the terminal formation member 560 and the terminal formation part 580 together by welding are provided at a total of eight positions: i.e., a position in a left end portion; a position in a right end portion; and two intermediate positions, in each of a bar 563a on the upper side and a bar 563b on the lower side of the frame part 563 of the terminal formation member 560. The four joining points P1 in the bar 563b on the lower side are arranged in the left-right direction on the electrode terminal part 570 side with respect to the openings 551, 582.

In the bus bar body member 550, the four openings 551 correspond to the four joining points P1 on the lower side, and each opening 551 is positioned in the vicinity of a corresponding joining point P1 and on the electrode terminal part 570 side with respect to the joining point P1. Each opening 551 overlaps a corresponding joining point P1 in a direction (the up-down direction) orthogonal to the direction (the left-right direction) in which the four joining points P1 are arranged. That is, in the up-down direction, each joining point P1 is positioned in a range of the width in the left-right direction of a corresponding opening 551.

With reference to FIG. 10 and FIG. 12, the second bus bar 600A is implemented by a bus bar body member 650, and a terminal formation member 660 formed separately from the bus bar body member 650. The bus bar body member 650 and the terminal formation member 660 are each formed by subjecting a metal plate, e.g., a copper plate, being an electrically conductive material processed into a predetermined shape, to processing such as cutting and raising, bending, and the like, as appropriate.

The bus bar body member 650 has a shape of a quadrate plate that is longer in the up-down direction than the bus bar body member 550 of the first bus bar 500A and of which a lower end portion is substantially perpendicularly bent as an electrode terminal part 670. The bus bar body member 650 is provided with, in an upper portion thereof, a terminal formation part 680 (indicated by a broken line in FIG. 12) on and to which the terminal formation member 660 is superposed and fixed. In the terminal formation part 680, two connection terminal parts 681 having quadrate shapes are formed so as to be arranged in the left-right direction (one direction), by portions of the terminal formation part 680 being cut and raised. The dimension in the front-rear direction of each connection terminal part 681 is greater than the dimension of each connection terminal part 581 of the bus bar body member 550 of the first bus bar 500A.

In the place, of the terminal formation part 680, where each connection terminal part 681 has been cut and raised, an opening 682 having a quadrate shape that is greater than the connection terminal part 681 is formed. The dimensions in the up-down direction and the left-right direction of each opening 682 is slightly greater than the dimensions in the up-down direction and the front-rear direction of each connection terminal part 681. In the terminal formation part 680, an opening 683 having a quadrate shape that is long in the up-down direction is formed to the left of the opening 682 on the left side. Further, in the terminal formation part 680, a hole portion 684 which is circular and a hole portion 685 which is oblong are formed on the left side and the right side, respectively, below the openings 682.

Further, in the bus bar body member 650 and below the terminal formation part 680, five openings 651 having quadrate shapes and corresponding to the five openings 502 of the first bus bar 500A are formed so as to be arranged in the left-right direction. In addition, in the bus bar body member 650, four openings 652 are formed below the terminal formation part 680 and above the five openings 651, i.e., between the terminal formation part 680 and the five openings 651. The four openings 652 are formed along the direction (the left-right direction) in which the connection terminal parts 681 are arranged. Each opening 652 has a quadrate shape that is long in the left-right direction, and the upper edge thereof is in contact with the lower edge of the terminal formation part 680. Therefore, when the terminal formation member 660 has been fixed to the terminal formation part 680, the upper edge of each opening 652 comes into contact with the lower edge of the terminal formation member 660.

The terminal formation member 660 has a configuration similar to that of the terminal formation member 560 of the first bus bar 500A, and includes three connection terminal parts 661 and three openings 662. The dimension in the front-rear direction of each connection terminal part 661 is greater than the dimension of each connection terminal part 561 of the terminal formation member 560 of the first bus bar 500A. As for the terminal formation member 660, a hole portion 664 which is circular and a hole portion 665 which is oblong are formed in a frame part 663.

As shown in FIG. 10, the terminal formation member 660 is superposed on the front face of the terminal formation part 680 of the bus bar body member 650. The left connection terminal part 681 of the terminal formation part 680 is passed through the center opening 662 of the terminal formation member 660, and the right connection terminal part 681 of the terminal formation part 680 is passed through the right-end opening 662 of the terminal formation member 660. The three connection terminal parts 661 and the two connection terminal parts 681 are alternately arranged in the left-right direction (one direction). Due to the overlapping between the openings 682, 683 of the terminal formation part 680 and the openings 662 of the terminal formation member 660, an opening 602 for allowing an external terminal (described later) to pass therethrough is formed on the right side of each connection terminal part 661, 681.

The terminal formation member 660 is fixed to the terminal formation part 680 by welding (spot welding). In the second bus bar 600A, joining points P2 for joining the terminal formation member 660 and the terminal formation part 680 together by welding are provided at a total of eight positions: i.e., a position in a left end portion; a position in a right end portion; and two intermediate positions, in each of a bar 663*a* on the upper side and a bar 663*b* on the lower side of the frame part 663 of the terminal formation member 660. The four joining points P2 in the bar 663*b* on the lower side are arranged in the left-right direction on the electrode terminal part 670 side with respect to the openings 662, 682.

In the bus bar body member 650, the four openings 652 correspond to the four joining points P2 on the lower side, and each opening 652 is positioned in the vicinity of a corresponding joining point P2 and on the electrode terminal part 670 side with respect to the joining point P2. Each opening 652 overlaps a corresponding joining point P2 in a direction (the up-down direction) orthogonal to the direction (the left-right direction) in which the four joining points P2 are arranged. That is, in the up-down direction, each joining point P2 is positioned in a range of the width in the left-right direction of a corresponding opening 652.

When the capacitor element unit 100A is to be assembled, first, the first bus bar 500A is superposed, from the front, on the second bus bar 600A with the insulation plate 700 therebetween, such that a terminal row composed of the three connection terminal parts 561 and the two connection terminal parts 581 is positioned below a terminal row composed of the three connection terminal parts 661 and the two connection terminal parts 681. Accordingly, a state where the five openings 502 of the first bus bar 500A, five openings 701 of the insulation plate 700, and the five openings 651 of the second bus bar 600A overlap each other in the front-rear direction, is established. In addition, a state where the front end positions of the three connection terminal parts 561 and the two connection terminal parts 581 of the first bus bar 500A and the front end positions of the three connection terminal parts 661 and the two connection terminal parts 681 of the second bus bar 600A are aligned with each other, is established.

Next, the first bus bar 500A and the second bus bar 600A are connected to the capacitor element 400. That is, the electrode terminal part 570 of the first bus bar 500A is joined to the first electrode 410 of the capacitor element 400 by a joining method such as soldering. Accordingly, the first bus bar 500A is electrically connected to the first electrode 410. Similarly, the electrode terminal part 670 of the second bus bar 600A is joined to the second electrode 420 of the capacitor element 400 by a joining method such as soldering. Accordingly, the second bus bar 600A is electrically connected to the second electrode 420. It should be noted that pin-like terminals may be formed in the electrode terminal parts 570, 670, and these terminals may be joined to the electrodes 410, 420 by soldering or the like.

As a result, the capacitor element unit 100A is completed as shown in FIG. 9B.

The capacitor element unit 100A is housed through an opening 201 into the case 200. The filling resin 300 in a liquid phase state is injected through the opening 201 into the case 200 in which the capacitor element unit 100A is housed. When the filling resin 300 has been filled into the case 200 up to the vicinity of the opening 201, and injection of the filling resin 300 is completed, the case 200 is heated. Accordingly, the filling resin 300 in the case 200 hardens. As a result, the film capacitor 1A as shown in FIG. 9A is completed.

The film capacitor 1A is mounted to an external device or the like. The external device or the like is provided with five external terminals 2*a* on the positive electrode side and five external terminals 2*b* on the negative electrode side, the external terminals 2*a*, 2*b* being in the form of bus bars, for example. For example, when the first bus bar 500A is the bus bar on the positive electrode side, and the second bus bar 600A is the bus bar on the negative electrode side, the five external terminals 2*a* pass through the three kinds of openings 651, 701, 502 overlapping each other in the front-rear direction, to come into contact with the five connection terminal parts 561, 581 of the first bus bar 500A, and are connected to the connection terminal parts 561, 581 by a joining method such as soldering. Further, the five external terminals 2*b* pass through the openings 602 to come into contact with the five connection terminal parts 661, 681 of the second bus bar 600A, and are connected to the connection terminal parts 661, 681 by a joining method such as soldering.

Next, a method for manufacturing the first bus bar 500A and the second bus bar 600A is described. The first bus bar 500A and the second bus bar 600A are each formed through a bus bar forming step.

In the bus bar forming step, first, a metal plate having a predetermined shape is subjected to processing such as cutting and raising, bending, and the like, as appropriate, thereby creating the bus bar body member 550, of the first bus bar 500A, that has the electrode terminal part 570 and the terminal formation part 580, and creating the terminal formation member 560. In the bus bar body member 550, the two connection terminal parts 581 are formed in the terminal formation part 580 so as to be arranged in one direction, by cutting and raising portions of the terminal formation part 580. In the bus bar body member 550, the four openings 551 are formed so as to be positioned in the vicinities of the joining points for joining the terminal formation part 580 and the terminal formation member 560 together by the later-performed welding, and on the electrode terminal part 570 side with respect to the joining points. Further, in the terminal formation member 560, the three connection terminal parts 561 are formed so as to be arranged in one direction, by cutting and raising portions of the terminal formation member 560. Further, in a manner similar to the above, the bus bar body member 650 and the terminal formation member 660 of the second bus bar 600A are created.

Next, using the dedicated jig 3, the terminal formation member 560 is joined and fixed to the bus bar body member 550, to form the first bus bar 500A.

FIGS. 13A and 13B are cross-sectional views, of the jig 3 to which the bus bar body member 550 and the terminal formation member 560 have been set, that has been cut at the position of a positioning pin 811 on the right side, and at the position of insertion holes 813, 822 for welding rods 841, 842, respectively.

When the terminal formation member 560 is to be joined and fixed to the bus bar body member 550, first, the terminal formation member 560 is set to a placement base 810 of the jig 3. At this time, the left and right pins 811 of the placement base 810 are inserted into the left and right hole portions 564, 565. Next, the bus bar body member 550 is set to the placement base 810. At this time, the left and right pins 811 of the placement base 810 are inserted into the left and right hole portions 584, 585 of the terminal formation part 580 of the bus bar body member 550. Accordingly, as shown in FIG. 13A, on the placement base 810, the terminal formation part 580 and the terminal formation member 560 are superposed with each other. The two connection terminal parts 581 of the terminal formation part 580 are passed through the two openings 562 of the terminal formation member 560, whereby the two connection terminal parts 581 and the three connection terminal parts 561 are alternately arranged in one direction. In addition, the terminal formation part 580 and the terminal formation member 560 are superposed with each other such that their hole portions 584, 564 (585, 565) are aligned with each other, and a pin 811 of the jig 3 is passed through the two hole portions 584, 564 (585, 565) that have been aligned, whereby a state where positioning thereof has been realized is established. Then, the bus bar body member 550 and the terminal formation member 560 set on the placement base 810 are pressed by the pressing plate 820.

Next, as shown in FIG. 13B, the eight welding rods 841 on the lower side are passed through the eight insertion holes 813 of the placement base 810, and their leading ends are applied to the terminal formation member 560. In addition, the eight welding rods 842 on the upper side are passed through the eight insertion holes 822 of the pressing plate 820, and their leading ends are applied to the terminal formation part 580 of the bus bar body member 550. Welding by the eight welding rods 841 on the lower side and welding by the eight welding rods 842 on the upper side are performed, whereby the terminal formation member 560 is fixed to the terminal formation part 580 at the joining points P1 at the eight places. For example, fiber laser welding can be performed as the welding.

During the welding, as for the first bus bar 500A, due to heat inputted from the upper and lower welding rods 842, 841 to the joining points P1, the temperature in the vicinity of each joining point P1 becomes high, and the heat spreads, whereby temperatures of the terminal formation member 560 and the terminal formation part 580 become high. Accordingly, expansion due to heat may be caused in the terminal formation member 560 and the terminal formation part 580. Here, in the bus bar body member 550, heat generated at the four lower-side joining points P1 of the terminal formation part 580 will move from the terminal formation part 580 to a region on the electrode terminal part 570 side. If the heat moves to the region on the electrode terminal part 570 side, the temperature of the terminal formation part 580 is difficult to be increased relative to the temperature of the terminal formation member 560. Therefore, the temperature of the terminal formation member 560 more easily becomes higher than that of the terminal formation part 580, and the terminal formation member 560 will be easily expanded. This will cause welding to be performed in a state where the terminal formation member 560 is expanded relative to the terminal formation part 580. Thus, when the first bus bar 500A is cooled after the welding, stress in the expanding and contracting direction is more likely to be caused in the terminal formation member 560, and accordingly, the first bus bar 500A is more likely to warp to the terminal formation member 560 side.

However, in the present embodiment, the four openings 551 are formed in the vicinities of the four joining points P1 of the bus bar body member 550 and on the electrode terminal part 570 side with respect to the joining points P1, and thus, heat that will move to the electrode terminal part 570 side is blocked by the openings 551. Accordingly, heat is difficult to be dissipated from the terminal formation part 580, and thus, difference in temperature between the terminal formation part 580 and the terminal formation member 560 is less likely to occur. Therefore, difference in the expansion amount between the terminal formation part 580 and the terminal formation member 560 is less likely to occur. Thus, when the first bus bar 500A is cooled after the welding, stress in the expanding and contracting direction is less likely to occur in the terminal formation member 560, and the first bus bar 500A is less likely to warp to the terminal formation member 560 side.

In particular, corresponding to each joining point P1, an opening 551 is provided immediately therebelow. Therefore, heat that has been generated in the vicinity of the joining point P1 and is going to move straight to the electrode terminal part 570 side can be blocked by the opening 551. Therefore, heat is further difficult to be dissipated from the terminal formation part 580, and thus, the first bus bar 500A is further less likely to warp.

In a manner similar to that for the first bus bar 500A, using the dedicated jig 3, the bus bar body member 650 is joined and fixed to the terminal formation member 660, whereby the second bus bar 600A is formed. In the second bus bar 600A as well, similar to the first bus bar 500A, warp to the terminal formation member 660 side is suppressed by the four openings 652 provided to the bus bar body member 650.

In the bus bar body member 650, the five openings 651 are formed on the electrode terminal part 670 side with respect to the terminal formation part 680. However, these openings 651 are significantly separated from the four lower-side joining points P2 of the terminal formation part 680. Therefore, in a case where the four openings 652 are eliminated, it is difficult to suppress warp of the second bus bar 600A within an allowable range.

Effects of Embodiment 2

According to the present embodiment, the following effects are exhibited.

The first bus bar 500A and the second bus bar 600A include: the bus bar body member 550, 650 having the terminal formation part 580, 680 and the electrode terminal part 570, 670 connected to the electrode 410, 420, and the terminal formation member 560, 660 superposed on the terminal formation part 580, 680 and fixed thereto by welding. In the terminal formation part 580, 680, a plurality of connection terminal parts 581, 681 protruding from the surface of the terminal formation part 580, 680 and to be connected to the external terminals 2a, 2b are formed so as to be arranged in one direction, by portions of the terminal formation part 580, 680 being cut and raised, and the openings 582, 682 are formed in the places where the portions have been cut and raised. In the terminal formation member 560, 660, a plurality of connection terminal parts 561, 661 protruding from the surface of the terminal formation member 560, 660 and to be connected to the external terminals 2a, 2b are formed so as to be arranged in one direction, by portions of the terminal formation member 560, 660 being cut and raised, and the openings 562, 662 are formed in the places where the portions have been cut and raised. Then, the connection terminal parts 581, 681 are passed through the openings 562, 662, whereby the connection terminal parts 581, 681 and the connection terminal parts 561, 661 are alternately arranged in one direction.

With this configuration, in the first bus bar 500A and the second bus bar 600A, when a plurality of connection terminal parts 561, 581, 661, 681 arranged in one direction are formed by cutting and raising, the width in the direction (the front-rear direction) protruding from the surface of the bus bar 500A, 600A of the connection terminal parts 561, 581, 661, 681 can be made greater than the interval at which the plurality of connection terminal parts 561, 581, 661, 681 are arranged. Accordingly, without being restricted by the interval at which the plurality of connection terminal parts 561, 581, 661, 681 are arranged, it is possible to easily prepare the first bus bar 500A and the second bus bar 600A that have connection terminal parts 561, 581, 661, 681 having sufficient widths in the protruding direction, in accordance with the connection relationship with an external device or the like.

Further, in the first bus bar 500A and the second bus bar 600A, a plurality of joining points P1, P2 for joining the terminal formation part 580, 680 and the terminal formation member 560, 660 together by welding are provided on the electrode terminal part 570, 670 side with respect to the openings 582, 682 and the openings 562, 662, and in the bus bar body member 550, 650, the openings 551, 652 are formed in the vicinities of the joining points P1, P2 and on the electrode terminal part 570, 670 side with respect to the joining points P1, P2.

With this configuration, during the welding, heat generated at the joining points P1, P2 of the terminal formation part 580, 680 is blocked by the openings 551, 652, and thus is difficult to be dissipated from the terminal formation part 580, 680. Therefore, between the terminal formation part 580, 680 and the terminal formation member 560, 660, difference in temperature is less likely to occur, and difference in the expansion amount is less likely to occur. Thus, when the first bus bar 500A and the second bus bar 600A are cooled after the welding, stress in the expanding and contracting direction is less likely to occur in the terminal formation member 560, 660, and the first bus bar 500A and the second bus bar 600A are less likely to warp to the terminal formation member 560, 660 side.

Further, the openings 551, 652 are formed so as overlap the joining points P1, P2 in a direction (the up-down direction) orthogonal to the direction (the left-right direction) in which the joining points P1, P2 are arranged.

With this configuration, heat that has been generated in the vicinities of the joining points P1, P2 and is going to move straight to the electrode terminal part 570, 670 side can be blocked by the openings 551, 652. Therefore, heat is further difficult to be dissipated from the terminal formation part 580, 680, and thus, the first bus bar 500A and the second bus bar 600A are further less likely to warp.

Although Embodiment 2 of the present invention has been described above, the present invention is not limited to Embodiment 2 above, and various application examples of the present invention can be made in addition to Embodiment 2 above.

Modification of Embodiment 2

Figure 14B:
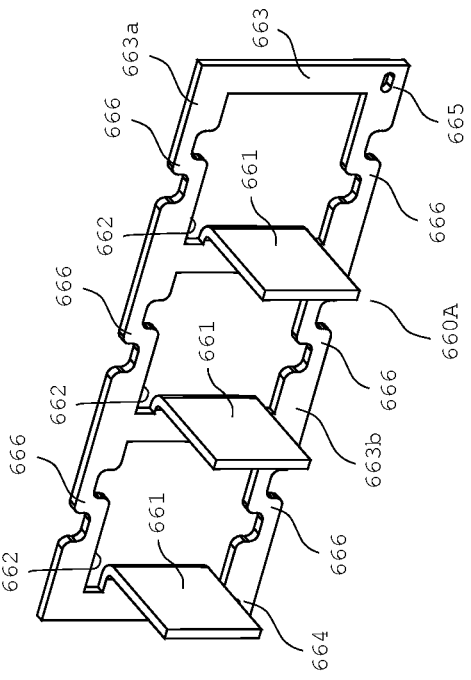
FIGS. 14A and 14B are perspective views of a terminal formation member of the first bus bar, and a terminal formation member of the second bus bar, respectively, according to a modification of Embodiment 2.
Figure 14D:
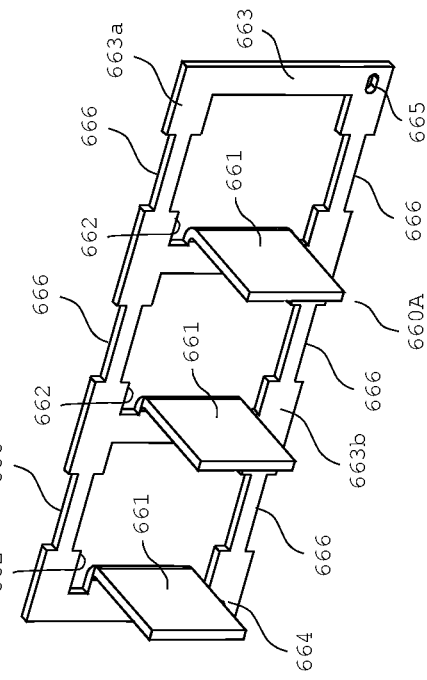
FIGS. 14C and 14D are perspective views of a terminal formation member of the first bus bar, and a terminal formation member of the second bus bar, respectively, according to a further modification of Embodiment 2.
Figure 14A:
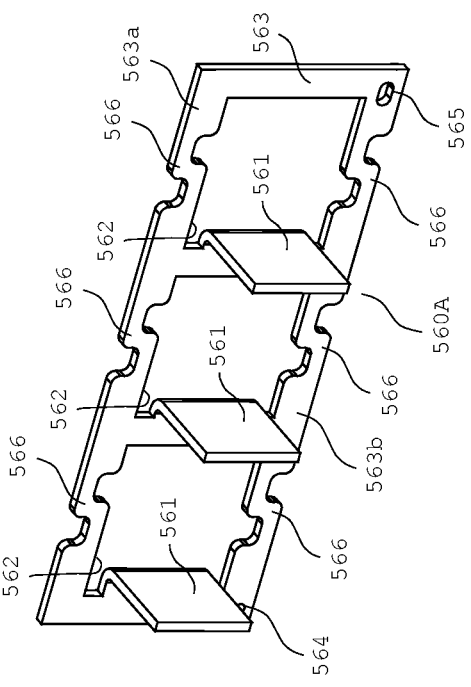

FIGS. 14A and 14B are perspective views of a terminal formation member 560A of the first bus bar 500A and a terminal formation member 660A of the second bus bar 600A, respectively, according to a modification of Embodiment 2.

Instead of the terminal formation members 560, 660 of Embodiment 2 above, the terminal formation members 560A, 660A of the present modification can be used.

As shown in FIG. 14A, in the terminal formation member 560A, narrow width portions 566 are formed at three places at a predetermined interval in each of the bar 563a on the upper side and the bar 563b on the lower side of the frame part 563. Each narrow width portion 566 has a waved shape in which the widths of portions close to the portions on both sides of the narrow width portion 566 in the frame part 563 are small. Similarly, as shown in FIG. 14B, in the terminal formation member 660A as well, narrow width portions 666 are formed at three places at a predetermined interval in each of the bar 663a on the upper side and the bar 663b on the lower side of the frame part 663. Each narrow width portion 566, 666 is positioned between adjacent two joining points P1, P2.

When the configuration of the present modification is adopted, during the welding, heat is easily blocked by the narrow width portions 566, 666, and heat conduction from the vicinities of the joining points P1, P2 is reduced, and thus, the amount of heat inputted to the joining points P1, P2 can be reduced. Accordingly, during the welding, high temperatures of the vicinities of the joining points P1, P2 are less likely to occur, and thus, high temperatures of the terminal formation members 560A, 660A are less likely to occur. Therefore, difference in temperature between the terminal formation part 580, 680 and the terminal formation member 560A, 660A is further less likely to occur, and thus, the first bus bar 500A and the second bus bar 600A are further less likely to warp.

Figure 14C:
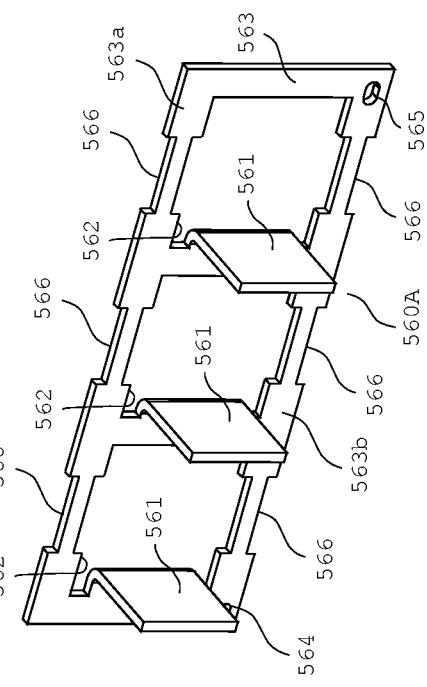

The shape of the narrow width portion 566, 666 is not limited to the shape described above, and may be a linear shape as shown in FIGS. 14C and 14D, for example. However, in a case where the narrow width portion 566, 666 has a waved shape, when compared with a case of a linear shape, the heat conduction path (the path at the narrow width portion) can be made long. Therefore, heat is more easily blocked, and temperature rise in the vicinities of the welding points (joining points) can be easily suppressed.

Further, in the modification above, the narrow width portions 566, 666 may also be provided to the left-side bar and the right-side bar of the frame part 563, 663 of the terminal formation member 560A, 660A.

Further, in Embodiment 2 above, in the first bus bar 500A and the second bus bar 600A, the joining points P1, P2 are provided at four places on each of the upper side and the lower side. However, the number of joining points P1, P2 is not limited to the number mentioned above, and can be changed as appropriate.

In Embodiment 2 above, in the bus bar body member 550, 650, one opening 551, 652 is formed so as to correspond to one joining point P1, P2. However, one opening 551, 652 may not necessarily be formed so as to correspond to one joining point P1, P2. For example, corresponding to two or more joining points P1, P2, an opening 551, 652 that has a large width in the left-right direction and that overlaps these joining points P1, P2 in the up-down direction may be formed. In this case, the size of the opening 551, 652 needs to be considered such that favorable electric conductivity is ensured between the connection terminal parts 561, 581, 661, 681 and the electrode terminal part 570, 670.

Further, in Embodiment 2 above, the openings 551, 652 are formed so as to overlap the joining points P1, P2 in a direction (the up-down direction) orthogonal to the direction (the left-right direction) in which the joining points P1, P2 are arranged. However, the openings 551, 652 may be formed so as not to overlap the joining points P1, P2 in the above-described orthogonal direction (the up-down direction).

Further, in Embodiment 2 above, in the bus bar body member 550, 650, each opening 551, 652 is formed at a position at which the upper edge thereof is in contact with the lower edge of the terminal formation part 580, 680. However, each opening 551, 652 may be formed at a position at which the upper edge thereof is separated from the lower edge of the terminal formation part 580, 680 as long as the opening 551, 652 is positioned in the vicinity of the joining point P1, P2, and warp of each of the first bus bar 500A and the second bus bar 600A can be suppressed to be in an allowable range. In this case, the distance from the joining point P1, P2 to the upper edge of the opening 551, 652 may be within 10 mm at most, preferably within 5 mm.

Further, in Embodiment 2 above, each opening 551, 652 is formed in a rectangular shape. However, the shape of the opening 551, 652 may be any shape, and may be a square shape or an elliptical shape, for example.

Further, in Embodiment 2 above, only the openings 551, 652 are formed in the vicinities of the joining points P1, P2 and on the electrode terminal part 570, 670 side (the down direction) with respect to the joining points P1, P2. However, in addition to the openings 551, 652, openings may further be formed in the vicinities of the upper and lower joining points P1, P2 at the left end, and to the left of the joining points P1, P2.

Further, in Embodiment 2 above, on the right side and the upper side of the terminal formation part 580, 680, there is no region of the bus bar body member 550, 650. However, in a case where there is a region of the bus bar body member 550, 650 on the upper side of the terminal formation part 580, 680, openings may be formed in the vicinities of the upper joining points P1, P2, and above the joining points P1, P2. In a case where there is a region of the bus bar body member 550, 650 on the right side of the terminal formation part 580, 680, openings may be formed in the vicinities of the upper and lower joining points P1, P2 at the right end, and to the right of the joining points P1, P2.

Figure 15B:
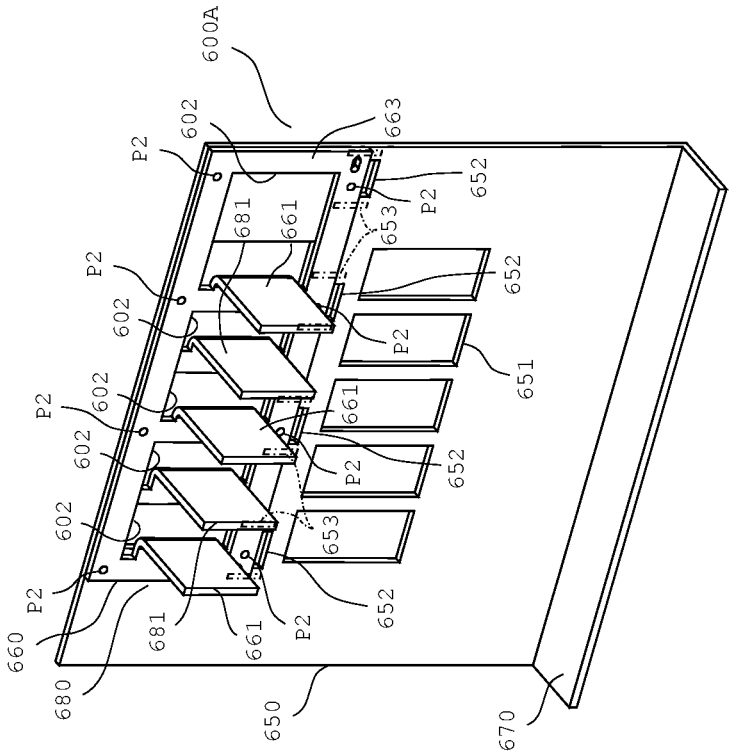
FIGS. 15A and 15B are perspective views of a first bus bar and a second bus bar, respectively, according to another modification of Embodiment 2.
Figure 15A:
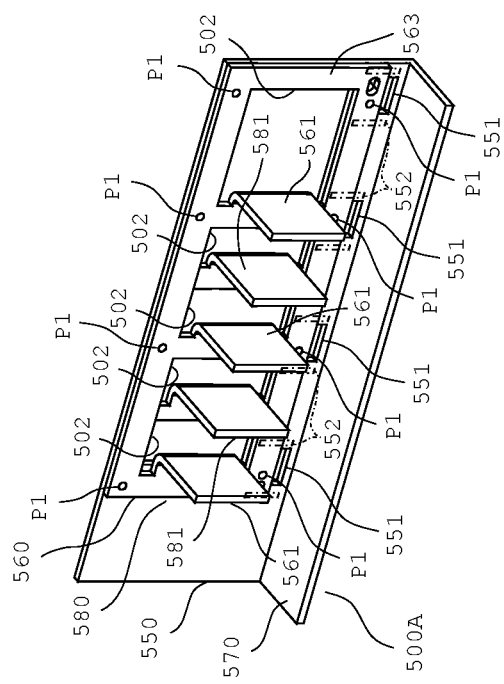

Further, as indicated by alternate long and short dash lines in FIGS. 15A and 15B, in the bus bar body member 550, 650, in addition to the openings 551, 652, openings 552, 653 may further be formed in the vicinities of the joining points P1, P2, and to the left and right of the joining points P1, P2. Further, the openings 552, 653 at the left and right may be continuous with an opening 551, 652, whereby one opening that surrounds the corresponding joining point P1, P2 from three directions may be formed.

Further, in Embodiment 2 above, in the first bus bar 500A and the second bus bar 600A, the terminal formation member 560, 660 is formed separately from the bus bar body member 550, 650. However, the terminal formation member 560, 660 may be formed integrally with the bus bar body member 550, 650 such that the upper ends or the right ends of the terminal formation member 560, 660 and the terminal formation part 580, 680 are continuous with each other. In this case, in the bus bar forming step, the terminal formation member 560, 660 is bent to be superposed on the terminal formation part 580, 680, and fixed thereto by welding.

Figure 16:
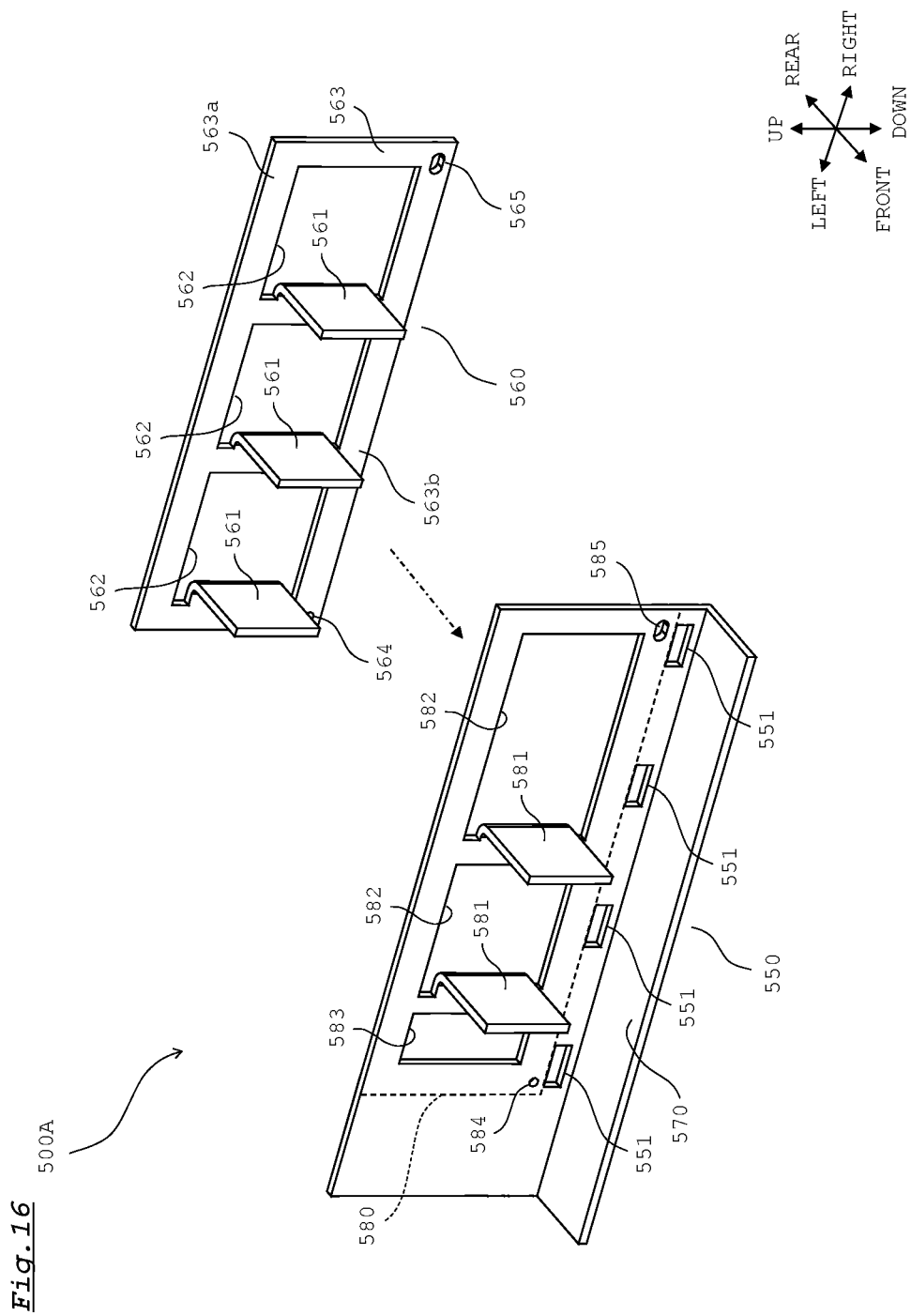
FIG. 16 is an exploded perspective view of a first bus bar according to another modification of Embodiment 2.
Figure 17:
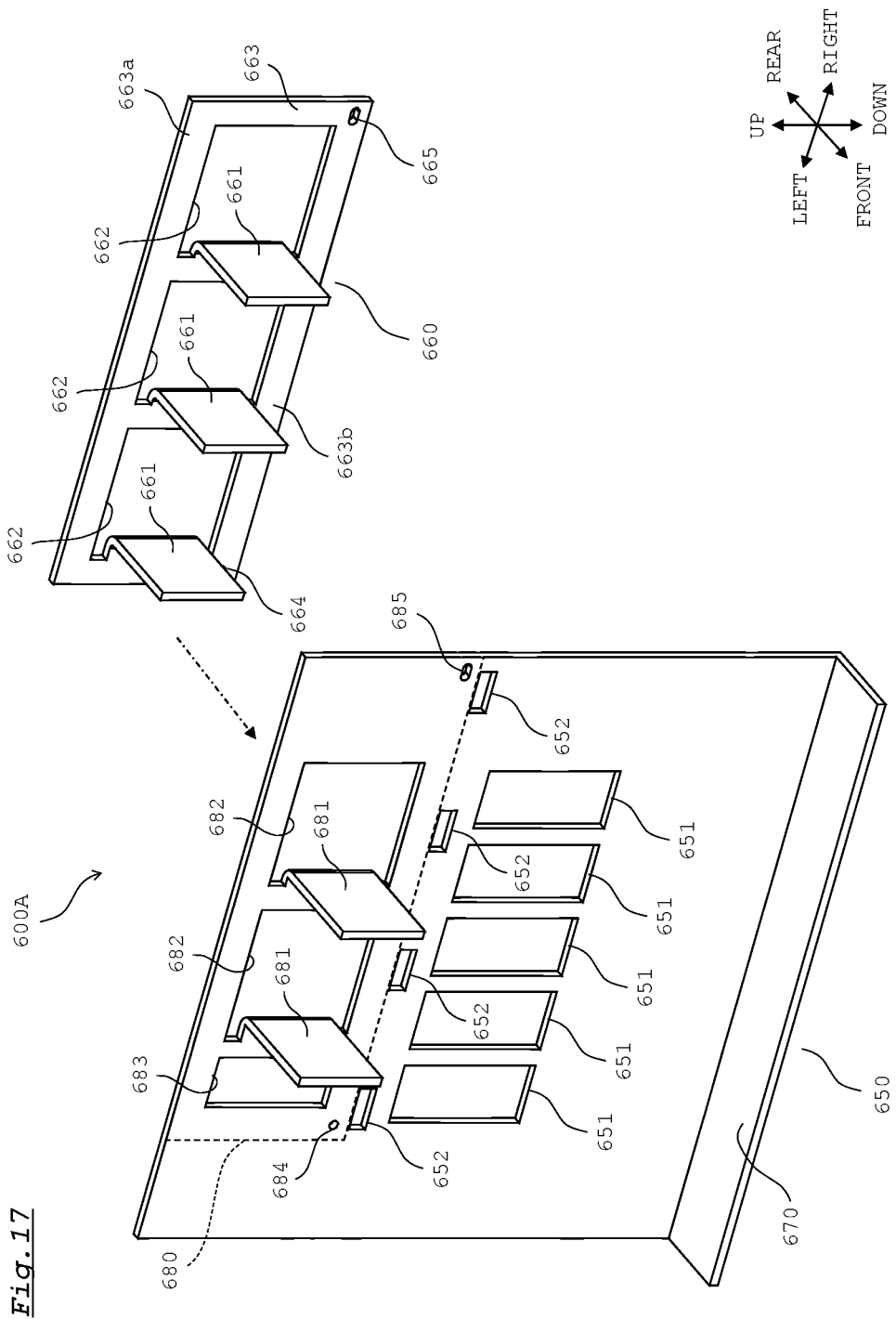
FIG. 17 is an exploded perspective view of a second bus bar according to another of modification of Embodiment 2.

Further, in Embodiment 2 above, the first bus bar 500A and the second bus bar 600A are configured such that: the connection terminal parts 581, 681 of the terminal formation part 580, 680 of the bus bar body member 550, 650 are passed through the openings 562, 662 of the terminal formation member 560, 660, whereby the connection terminal parts 581, 681 of the terminal formation part 580, 680 and the connection terminal parts 561, 661 of the terminal formation member 560, 660 are alternately arranged. However, conversely, as shown in FIG. 16 and FIG. 17, the first bus bar 500A and the second bus bar 600A may be configured such that: the connection terminal parts 561, 661 of the terminal formation member 560, 660 are passed through the openings 582, 682 of the terminal formation part 580, 680, whereby the connection terminal parts 581, 681 of the terminal formation part 580, 680 and the connection terminal parts 561, 661 of the terminal formation member 560, 660 are alternately arranged.

<Other Modifications>

In Embodiment 1 above, the first bus bar 500 and the second bus bar 600 are provided with five connection terminal parts composed of the three connection terminal parts 521, 621 and the two connection terminal parts 541, 641. However, the number of connection terminal parts provided to the first bus bar 500 and the second bus bar 600 is not limited to five, and may be any number as long as the number is plural. Similarly, the number of connection terminal parts provided to the first bus bar 500A and the second bus bar 600A is not limited to five, and may be any number as long as the number is plural.

Further in Embodiments 1, 2 above, one capacitor element 400 is provided to the film capacitor 1. However, the number of capacitor elements 400 may be two or more and may be changed as appropriate.

Further, in Embodiments 1, 2 above, the capacitor element 400 is formed by stacking two metalized films each obtained by depositing aluminum on a dielectric film, and by wounding or laminating the stacked metalized films. However, other than this, a metalized film obtained by depositing aluminum on both surfaces of a dielectric film and an insulation film may be stacked, and then wound or laminated, whereby the capacitor element 400 is formed.

Further, in Embodiments 1, 2 above, as an example of a capacitor of the present invention, the film capacitor 1 is used. However, the present invention can be applied to a capacitor other than the film capacitor 1.

In addition to the above, various modifications can be made as appropriate to the embodiments of the present invention without departing from the scope of the technical idea defined by the claims.

In the description of the embodiments above, the terms that indicate directions such as "up" and "down" are relative directions that are dependent only on the relative positional relationship between component members, and do not indicate absolute directions such as the vertical direction and the horizontal direction.

What is claimed is:
1. A capacitor comprising:
a capacitor element; and a bus bar configured to be connected to an electrode of the capacitor element, wherein the bus bar includes a bus bar body member having a terminal formation part and an electrode terminal part configured to be connected to the electrode, and a terminal formation member formed separately from the bus bar body member and configured to be superposed on and fixed to the terminal formation part, in the terminal formation part, a plurality of first connection terminal parts protruding from a surface of the terminal formation part and configured to be connected to external terminals are formed so as to be arranged in one direction, by portions of the terminal formation part being cut and raised, and first openings are formed in places where the portions have been cut and raised, in the terminal formation member, a plurality of second connection terminal parts protruding from a surface of the terminal formation member and configured to be connected to external terminals are formed so as to be arranged in one direction, by portions of the terminal formation member being cut and raised, and second openings are formed in places where the portions have been cut and raised, and the first connection terminal parts and the second connection terminal parts are alternately arranged in one direction, by the first connection terminal parts being passed through the second openings, or by the second connection terminal parts being passed through the first openings, wherein, in the terminal formation member, a frame part surrounding the second openings is provided with, at a predetermined interval, a plurality of joining points at which the terminal formation member is joined to the terminal formation part by welding, and wherein the frame part is provided with, between adjacent two of the joining points, a narrow width portion having a width smaller than that of a portion where each joining point is provided.

2. A capacitor comprising:

a capacitor element; and a bus bar configured to be connected to an electrode of the capacitor element, wherein the bus bar includes a bus bar body member having a terminal formation part and an electrode terminal part configured to be connected to the electrode, and a terminal formation member configured to be superposed on the terminal formation part and fixed thereto by welding, in the terminal formation part, a plurality of first connection terminal parts protruding from a surface of the terminal formation part and configured to be connected to external terminals are formed so as to be arranged in one direction, by portions of the terminal formation part being cut and raised, and first openings are formed in places where the portions have been cut and raised, in the terminal formation member, a plurality of second connection terminal parts protruding from a surface of the terminal formation member and configured to be connected to external terminals are formed so as to be arranged in one direction, by portions of the terminal formation member being cut and raised, and second openings are formed in places where the portions have been cut and raised, the first connection terminal parts and the second connection terminal parts are alternately arranged in one direction, by the first connection terminal parts being passed through the second openings, or by the second connection terminal parts being passed through the first openings, in the bus bar, a plurality of joining points for joining the terminal formation part and the terminal formation member together by welding are provided on the electrode terminal part side with respect to the first openings and the second openings, and in the bus bar body member, third openings are formed in vicinities of the joining points and on the electrode terminal part side with respect to the joining points.

3. The capacitor according to claim 2, wherein the third openings are formed so as to overlap the joining points in a direction orthogonal to a direction in which the joining points are arranged.

4. The capacitor according to claim 2, wherein in the terminal formation member, a frame part surrounding the second openings is provided with, at a predetermined interval, a plurality of the joining points, and the frame part is provided with, between adjacent two of the joining points, a narrow width portion having a width smaller than that of a portion where each joining point is provided.

* * * * *